(12) United States Patent
Fujioka et al.

(10) Patent No.: US 7,961,280 B2
(45) Date of Patent: Jun. 14, 2011

(54) SEMI-TRANSMISSIVE LIQUID CRYSTAL DISPLAY DEVICE AND MANUFACTURING METHOD THEREOF

(75) Inventors: Kazuyoshi Fujioka, Osaka (JP); Masaaki Saitoh, Mie (JP); Toshiyuki Tanaka, Mie (JP); Masakatsu Tominaga, Mie (JP); Tetsuo Fujita, Mie (JP); Yuji Suehiro, Mie (JP); Hijiri Nakahara, Mie (JP); Kazuhiro Yoshikawa, Mie (JP)

(73) Assignee: Sharp Kabushiki Kaisha, Osaka (JP)

( * ) Notice: Subject to any disclaimer, the term of this patent is extended or adjusted under 35 U.S.C. 154(b) by 88 days.

(21) Appl. No.: 12/279,262

(22) PCT Filed: Jan. 9, 2007

(86) PCT No.: PCT/JP2007/050104
§ 371 (c)(1),
(2), (4) Date: Aug. 13, 2008

(87) PCT Pub. No.: WO2007/129480
PCT Pub. Date: Nov. 15, 2007

(65) Prior Publication Data
US 2009/0219473 A1      Sep. 3, 2009

(30) Foreign Application Priority Data

May 1, 2006   (JP) .................................. 2006-127465
Jul. 21, 2006  (JP) .................................. 2006-199908

(51) Int. Cl.
*G02F 1/1335* (2006.01)

(52) U.S. Cl. .................................................... 349/114

(58) Field of Classification Search ........................ None
See application file for complete search history.

(56) References Cited

U.S. PATENT DOCUMENTS 6,771,338 B2 *  8/2004  Wang ............................ 349/114
6,806,934 B2 * 10/2004  Furuhashi et al. ............ 349/139
6,831,718 B2 * 12/2004  Wei et al. ...................... 349/114
(Continued)

FOREIGN PATENT DOCUMENTS
JP            2003-255378         9/2003
(Continued)

OTHER PUBLICATIONS

International Search Report for PCT/JP2007/050104 dated Apr. 11, 2007.

*Primary Examiner* — Mark A Robinson
*Assistant Examiner* — Mary A El-Shammaa
(74) *Attorney, Agent, or Firm* — Nixon & Vanderhye P.C.

(57) ABSTRACT

In a semi-transmissive liquid crystal display device (50a) including an active matrix substrate (20a), the active matrix substrate (20a) includes a plurality of source lines (2), a first transparent electrode (2c) connected to each source line (2) through a TFT (5), an interlayer insulating film (12) provided on the first transparent electrode (2c) and having an opening (12a), a reflective electrode (6) provided on the interlayer insulating film (12) and connected to the first transparent electrode (2c) through the opening (12a), and a second transparent electrode (7a) overlapping the reflective electrode (6a) and the first transparent electrode (2c) and connected to the reflective electrode (6a) and the first transparent electrode (2c). In each pixel, respective outer peripheral ends (E) of the reflective electrode (6a) and the second transparent electrode (7a) are aligned with each other.

10 Claims, 27 Drawing Sheets

U.S. PATENT DOCUMENTS

| | | |
|---|---|---|
| 7,084,849 B2 | 8/2006 | Noguchi et al. |
| 7,133,094 B2 | 11/2006 | Ogawa et al. |
| 7,218,364 B2 * | 5/2007 | Brindel .................. 349/114 |
| 7,443,456 B2 * | 10/2008 | Lai ........................ 349/38 |
| 2003/0112213 A1 * | 6/2003 | Noguchi et al. ........... 345/96 |
| 2005/0094066 A1 * | 5/2005 | Brindel .................. 349/114 |
| 2006/0125755 A1 * | 6/2006 | Noguchi et al. ........... 345/96 |
| 2006/0139524 A1 * | 6/2006 | Chen ..................... 349/114 |
| 2008/0123000 A1 * | 5/2008 | Lin et al. ................ 349/33 |

FOREIGN PATENT DOCUMENTS

| | | |
|---|---|---|
| JP | 2003-315766 | 11/2003 |
| JP | 2004-191958 | 7/2004 |

\* cited by examiner

US 7,961,280 B2

SEMI-TRANSMISSIVE LIQUID CRYSTAL DISPLAY DEVICE AND MANUFACTURING METHOD THEREOF

This application is the U.S. national phase of International Application No. PCT/JP2007/050104, filed 9 Jan. 2007, which designated the U.S. and claims priority to Japanese Patent Application No(s). 2006-127465, filed 1 May, 2006, and 2006-199908, filed 21 Jul. 2006, the entire contents of each of which are hereby incorporated by reference.

TECHNICAL FIELD

The invention relates to a semi-transmissive liquid crystal display device and a manufacturing method thereof.

BACKGROUND ART

A semi-transmissive liquid crystal display device has a transmissive region for transmitting light from a backlight to provide transmission mode display and a reflective region for reflecting external light to provide reflection mode display in each pixel arranged in a matrix pattern as a minimum unit of an image. Therefore, the semi-transmissive liquid crystal display device can maintain a sufficient contrast and provide a high visual recognition property regardless of ambient brightness.

An active matrix-driven liquid crystal display device includes an active matrix substrate having a plurality of pixel electrodes arranged in a matrix pattern, a counter substrate provided so as to face the active matrix substrate and having a common electrode, and a liquid crystal layer provided between these substrates. In a semi-transmissive liquid crystal display device as described above, each pixel electrode includes a transparent electrode that forms the transmissive region and a reflective electrode that forms the reflective region. The reflective electrode is often made of a metal conductive film having a high reflectance such as an aluminum film, and the transparent electrode is often made of a transparent conductive film such as an ITO (Indium Tin Oxide) film and an IZO (Indium Zinc Oxide) film.

Each electrode material such as the metal conductive film and transparent conductive film has its own unique work function. Therefore, in the semi-transmissive liquid crystal display device, the reflective electrode and the transparent electrode have different work functions from each other. In this case, a surface potential is different between the reflective electrode and the transparent electrode, thereby causing flicker. This may result in significant degradation in display quality.

The reason why such flicker is generated will now be described.

In order to prevent image burn-in, a liquid crystal display device needs to be AC (alternating current)-driven by alternately applying a positive voltage and a negative voltage to a liquid crystal layer. More specifically, a positive voltage and a negative voltage are alternately applied to the liquid crystal layer by writing charges to pixel electrodes with the polarity of the charges being inverted at every prescribed period. At this time, an optimal counter potential is set to a common electrode of a counter substrate so that the positive and negative voltages that are applied to the liquid crystal layer become effectively equal to each other.

In a semi-transmissive liquid crystal display device, however, a surface potential becomes different between a reflective electrode and a transparent electrode due to the above-described difference in work function, and an optimal counter potential is set to only one of the reflective electrode and the transparent electrode. In this case, a direct-current voltage is applied to a liquid crystal layer in a region of the electrode to which the optimal counter potential is not set. Therefore, the positive and negative voltages applied to the liquid crystal layer become asymmetrical, whereby flicker, periodic luminance variation, is generated.

It is known in the art that generation of flicker is suppressed in a semi-transmissive liquid crystal display device when respective electrode materials in the reflective region and the transmissive region have the same work function.

For example, Patent document 1 discloses a liquid crystal display device in which a transparent electrode is provided in a reflective region and a transmissive region and a voltage is applied to a liquid crystal layer through the transparent electrode.

FIG. 39 is a schematic cross-sectional view of a semi-transmissive liquid crystal display device 150a corresponding to the semi-transmissive liquid crystal display device disclosed in FIG. 6 of Patent document 1.

As shown in FIG. 39, the semi-transmissive liquid crystal display device 150a includes an active matrix substrate 120a having pixel electrodes each formed by a reflective electrode 106a and a transparent electrode 107a, a counter substrate 130a provided so as to face the active matrix substrate 120a and having a common electrode 122, and a liquid crystal layer 125 provided between the substrates 120a and 130a.

In the semi-transmissive liquid crystal display device 150a, an interlayer insulating film 112 for compensating for the optical path difference between a reflective region R and a transmissive region T is provided under the reflective electrode 106a. Therefore, the transparent electrode 107a is formed in the reflective region R and the transmissive region T through a stepped portion of the interlayer insulating film 112. Accordingly, when the transparent electrode 107a is thin, electric conduction may become defective in the stepped portion. When the transparent electrode 107a is thick, on the other hand, the reflectance of the reflective region R may be reduced.

A semi-transmissive liquid crystal display device 150b as shown in FIG. 40 is disclosed in FIG. 3 of Patent document 2.

In the semi-transmissive liquid crystal display device 150b, a first transparent electrode 102 made of an ITO film is formed on a substrate 110a. A reflective electrode 106a made of an aluminum film or the like and a second transparent electrode 107b made of an IZO film are sequentially formed on an interlayer insulating film 112 formed on the first transparent electrode 102. A region where the reflective electrode 106a and the second transparent electrode 107b are formed serves as a reflective region R, and a region exposed from the reflective electrode 106a in the first transparent electrode 102 serves as a transmissive region T.

The ITO film and the IZO film have a work function of 4.9 eV and 4.8 eV, respectively. The respective electrode materials in the reflective region R and the transmissive region T thus have almost the same work function. However, since flicker is slightly visually recognized, there is room for improvement. Note that, in view of transparency to visible light, conductive property, etching property and electrocorrosion with the underlying aluminum film, and the like, the IZO film is preferably used as the second transparent electrode 107b that covers the reflective electrode 106b. Therefore, the second transparent electrode 107b is not formed in the transmissive region T if priority is given to the efficiency of the manufacturing process.

Patent document 1: Japanese Laid-Open Patent Publication No. 2003-255378

Patent document 2: Japanese Laid-Open Patent Publication No. 2004-191958

DISCLOSURE OF THE INVENTION

Problems to be Solved by the Invention

In an active matrix substrate of a liquid crystal display device, a plurality of source lines for supplying a display signal to each pixel are provided in parallel with each other between pixels. Since each source line and each adjacent pixel electrode along the source line overlap each other, a parasitic capacitance Csd is present between each source electrode and pixel electrode.

In a semi-transmissive liquid crystal display device, a peripheral end of a pixel electrode is often formed by a layered film of a reflective electrode and a transparent electrode each patterned by photolithography. Therefore, an overlap width between the pixel electrode, that is, the reflective electrode and transparent electrode, and the source line may vary due to a variation in manufacturing process. In this case, the parasitic capacitance Csd may vary in every pixel or every plurality of pixels. This may cause non-uniform luminance in the display screen, resulting in degradation in display quality.

The invention is made in view of the above problems and it is an object of the invention to provide a semi-transmissive liquid crystal display device in which normal conduction between a reflective electrode and a transparent electrode and a high reflectance are maintained, whereby generation of flicker is suppressed and variation in parasitic capacitance between a source line and a reflective electrode and transparent electrode is suppressed.

Means for Solving the Problems

In order to achieve the above object, according to the invention, an active matrix substrate includes a first transparent electrode provided in each pixel and connected to each source line through a switching element, a reflective electrode provided in each pixel and connected to the first transparent electrode through an opening of an insulating layer, and a second transparent electrode provided in each pixel so as to overlap the reflective electrode and the first transparent electrode, and respective outer peripheral ends of the reflective electrode and the second transparent electrode are aligned with each other.

More specifically, a semi-transmissive liquid crystal display device according to the invention includes: an active matrix substrate and a counter substrate which are provided so as to face each other; and a liquid crystal layer provided between the active matrix substrate and the counter substrate, wherein a plurality of pixels each having a reflective region for providing reflection mode display and a transmissive region for providing transmission mode display are arranged in a matrix pattern. The active matrix substrate includes a plurality of source lines extending in parallel with each other between the pixels, a first transparent electrode provided in each pixel and connected to each source line through a switching element, an insulating layer provided on the first transparent electrode and having an opening in each pixel, a reflective electrode provided in each pixel on the insulating layer and connected to the first transparent electrode through the opening, and a second transparent electrode provided in each pixel, overlapping the reflective electrode and an exposed region of the first transparent electrode from the reflective electrode, and connected to the reflective electrode and the first transparent electrode. A region where the reflective electrode is formed and the exposed region of the first transparent electrode from the reflective electrode form the reflective region and the transmissive region, respectively, and respective outer peripheral ends of the reflective electrode and the second transparent electrode are aligned with each other in each pixel.

In the above structure, the reflective electrode is connected to the first transparent electrode through the opening of the insulating layer, and the second transparent electrode overlaps the reflective electrode and the exposed region of the first transparent electrode from the reflective electrode and is connected to the reflective electrode and the first transparent electrode. The reflective electrode and the second transparent electrode are thus connected to the first transparent electrode. In this structure, normal conduction between the reflective electrode and the first transparent electrode is maintained even if the thickness of the second transparent electrode is reduced. Therefore, the second transparent electrode can be formed with a smaller thickness, and a high reflectance can be maintained in the reflective region. Moreover, since the second transparent electrode is provided on the liquid crystal layer side in the reflective region and the transmissive region, each electrode material on the liquid crystal layer side has the same work function in the reflective region and the transmissive region, whereby generation of flicker is suppressed.

Moreover, in each pixel, the respective outer peripheral ends of the reflective electrode and the second transparent electrode are aligned with each other on the insulating layer. This structure suppresses variation in overlap width between each source line provided between the pixels and the respective outer peripheral ends of the reflective electrode and the second transparent electrode through the insulating layer, and therefore suppresses variation in parasitic capacitance between the source line and the reflective electrode and second transparent electrode.

The invention can thus provide a semi-transmissive liquid crystal display device in which normal conduction between a reflective electrode and a transparent electrode and a high reflectance are maintained and generation of flicker is suppressed as well as variation in parasitic capacitance between a source line and a reflective electrode and transparent electrode is suppressed.

The first transparent electrode may be made of a compound of indium oxide and tin oxide, and the second transparent electrode may be made of a compound of indium oxide and zinc oxide.

In the above structure, the work function of the first transparent electrode is 4.9 eV and the work function of the second transparent electrode is 4.8 eV. However, the second transparent electrode is provided in both the reflective region and the transmissive region. Therefore, each electrode material on the liquid crystal layer side in the reflective region and the transmissive region has the same work function, whereby generation of flicker is specifically suppressed.

The second transparent electrode may have a thickness of 50 Å to 300 Å.

In the above structure, when the thickness of the second transparent electrode is less than 50 Å, normal conduction is less likely to be obtained between the first transparent electrode and the reflective electrode due to the small thickness of the second transparent electrode overlapping the first transparent electrode and the reflective electrode. When the thickness of the second transparent electrode exceeds 300 Å, the reflectance is reduced due to the large thickness of the second transparent electrode on the reflective electrode. Accordingly, when the thickness of the second transparent electrode is in the range of 50 Å to 300 Å, normal conduction between the reflective electrode and the transparent electrode and a high reflectance are maintained, whereby generation of flicker is suppressed.

The liquid crystal layer may be structured so as to be vertically oriented when no voltage is applied.

In a vertical alignment type liquid crystal display device, liquid crystal molecules are substantially vertically oriented with respect to a substrate surface when no voltage is applied to a liquid crystal layer. In such a vertical alignment type liquid crystal display device, a V-T curve of applied voltage (V) and transmittance (T) is generally steeper than a V-T curve of a TN (Twisted Nematic) type liquid crystal display device in a low transmittance region in which non-uniform luminance is more likely to be visually recognized. Therefore, the luminance significantly changes with variation in applied voltage. Since the above structure suppresses variation in parasitic capacitance between the source line and the reflective electrode and transparent electrode, variation in applied voltage resulting from the variation in parasitic capacitance is reduced and degradation in display quality is effectively suppressed in the vertical alignment type liquid crystal display device.

The insulating layer may be formed so that a thickness of the liquid crystal layer in the reflective region becomes one half of a thickness of the liquid crystal layer in the transmissive region.

This structure compensates for the phase difference between the reflective region and the transmissive region.

The reflective electrode may have a first metal layer provided in contact with the first transparent electrode and a second metal layer formed on the first metal layer, and the second transparent electrode may have an opening formed so as to expose a part of the first transparent electrode.

In the above structure, an opening that exposes a part of the first transparent electrode is formed in the second transparent electrode. Therefore, the outer peripheral end and the opening of the second transparent electrode are formed simultaneously. In the case where the outer peripheral end and the opening of the second transparent electrode are formed by wet etching, the first transparent electrode is exposed to an etchant. Therefore, when the outer peripheral end of the second transparent electrode is formed by etching, the etching rate of the first metal layer is lower than that in the case where no opening is formed in the second transparent electrode of each pixel. Therefore, the etching amount of the first metal layer is less likely to vary even if the etching time varies. This improves dimensional accuracy of the first metal layer. As a result, the respective outer peripheral ends of the first metal layer and the second metal layer are more likely to be aligned with each other, and the respective outer peripheral ends of the reflective electrode formed by the first metal layer and second metal layer and the second transparent electrode are more likely to be aligned with each other. As a result, variation in parasitic capacitance between the source line and the reflective electrode and second transparent electrode is suppressed.

According to the invention, a method for manufacturing a semi-transmissive liquid crystal display device including an active matrix substrate and a counter substrate which are provided so as to face each other, and a liquid crystal layer provided between the active matrix substrate and the counter substrate, wherein a plurality of pixels each having a reflective region for providing reflection mode display and a transmissive region for providing transmission mode display are arranged in a matrix pattern, includes the steps of: a first transparent electrode formation step of forming a plurality of source lines extending in parallel with each other on a substrate and forming in each pixel a first transparent electrode connected to each source line through a switching element; an insulating layer formation step of forming on the first transparent electrode an insulating layer having an opening in each pixel; a reflective conductive film formation step of forming a reflective conductive film so as to cover the insulating layer; a first etching step of, by etching a portion of the reflective conductive film corresponding to the opening, forming a reflective conductive layer connected to the first transparent electrode through the opening of the insulating layer; a transparent conductive film formation step of forming a transparent conductive film so as to cover the reflective conductive layer; and a second etching step of, by etching a portion of the reflective conductive layer and transparent conductive film located between the pixels, forming a reflective electrode connected to the first transparent electrode through the opening of the insulating layer, and a second transparent electrode overlapping the reflective electrode and an exposed region of the first transparent electrode from the reflective electrode and connected to the reflective electrode and the first transparent electrode, thereby fabricating the active matrix substrate in which a region where the reflective electrode is formed and the exposed region of the first transparent electrode from the reflective electrode serve as the reflective region and the transmissive region, respectively, wherein in the second etching step, the reflective conductive layer and the transparent conductive film are etched so that respective outer peripheral ends of the reflective electrode and the second transparent electrode are aligned with each other in each pixel.

In the above method, the reflective electrode is connected to the first transparent electrode through the opening of the insulating layer by the reflective conductive film formation step and the first etching step. Moreover, the second transparent electrode overlaps the reflective electrode and the exposed region of the first transparent electrode from the reflective electrode and is connected to the reflective electrode and the first transparent electrode by the transparent conductive film formation step and the second etching step. The reflective electrode and the second transparent electrode are thus connected to the first transparent electrode. In this structure, normal conduction between the reflective electrode and the first transparent electrode is maintained even if the thickness of the second transparent electrode is reduced. Therefore, the second transparent electrode can be formed with a smaller thickness, and a high reflectance can be maintained in the reflective region. Moreover, since the second transparent electrode is formed on the liquid crystal layer side in the reflective region and the transmissive region, each electrode material on the liquid crystal layer side has the same work function in the reflective region and the transmissive region, whereby generation of flicker is suppressed.

Moreover, by the second etching step, the respective outer peripheral ends of the reflective electrode and the second transparent electrode are aligned with each other on the insulating layer in each pixel. This structure suppresses variation in overlap width between each source line provided between the pixels and the respective outer peripheral ends of the reflective electrode and the second transparent electrode through the insulating layer, and therefore suppresses variation in parasitic capacitance between the source line and the reflective electrode and second transparent electrode.

The invention can thus provide a semi-transmissive liquid crystal display device in which normal conduction between a reflective electrode and a transparent electrode and a high reflectance are maintained and generation of flicker is suppressed as well as variation in parasitic capacitance between a source line and a reflective electrode and transparent electrode is suppressed.

The first transparent electrode may be made of a compound of indium oxide and tin oxide, and the second transparent electrode may be made of a compound of indium oxide and zinc oxide.

According to the above method, the work function of the first transparent electrode is 4.9 eV and the work function of the second transparent electrode is 4.8 eV. However, the second transparent electrode is provided in both the reflective region and the transmissive region. Therefore, each electrode material in the reflective region and the transmissive region has the same work function, whereby generation of flicker is specifically suppressed.

In the reflective conductive film formation step, a first metal film and a second metal film may be sequentially formed so as to cover the insulating layer, and in the second etching step, the transparent conductive film may be wet-etched so as to expose a part of the first transparent electrode in each pixel.

According to the above method, in the second etching step, the transparent conductive film is wet-etched so as to expose a part of the first transparent electrode in each pixel. The first transparent electrode is therefore exposed to an etchant. Accordingly, when a layered film of the reflective conductive layer formed by the first metal film and second metal film and the transparent conductive layer is etched in a region between the pixels in the second etching step, the etching rate of the first metal film is lower than that in the case where a part of the first transparent electrode is not exposed in each pixel. Therefore, the etching amount of the first metal film is less likely to vary even if the etching time of the second etching step varies. This improves dimensional accuracy of a first metal layer formed by the first metal film. As a result, the respective outer peripheral ends of the first metal layer formed by the first metal film and the second metal layer formed by the second metal film are more likely to be aligned with each other, and the respective outer peripheral ends of the reflective electrode formed by the first metal layer and second metal layer and the second transparent electrode are more likely to be aligned with each other. As a result, variation in parasitic capacitance between the source line and the reflective electrode and second transparent electrode is suppressed.

EFFECTS OF THE INVENTION

According to the invention, an active matrix substrate includes a first transparent electrode provided in each pixel and connected to each source line through a switching element, a reflective electrode provided in each pixel and connected to the first transparent electrode through an opening of an insulating layer, and a second transparent electrode provided in each pixel so as to overlap the reflective electrode and the first transparent electrode, and respective outer peripheral ends of the reflective electrode and the second transparent electrode are aligned with each other. The invention can thus provide a semi-transmissive liquid crystal display device in which normal conduction between a reflective electrode and a transparent electrode and a high reflectance are maintained and generation of flicker is suppressed as well as variation in parasitic capacitance between a source line and a reflective electrode and transparent electrode is suppressed.

BRIEF DESCRIPTION OF THE DRAWINGS

FIG. 39 is a schematic cross-sectional view of a conventional semi-transmissive liquid crystal display device 150a;

DESCRIPTION OF THE REFERENCE NUMERALS

Figure 1:
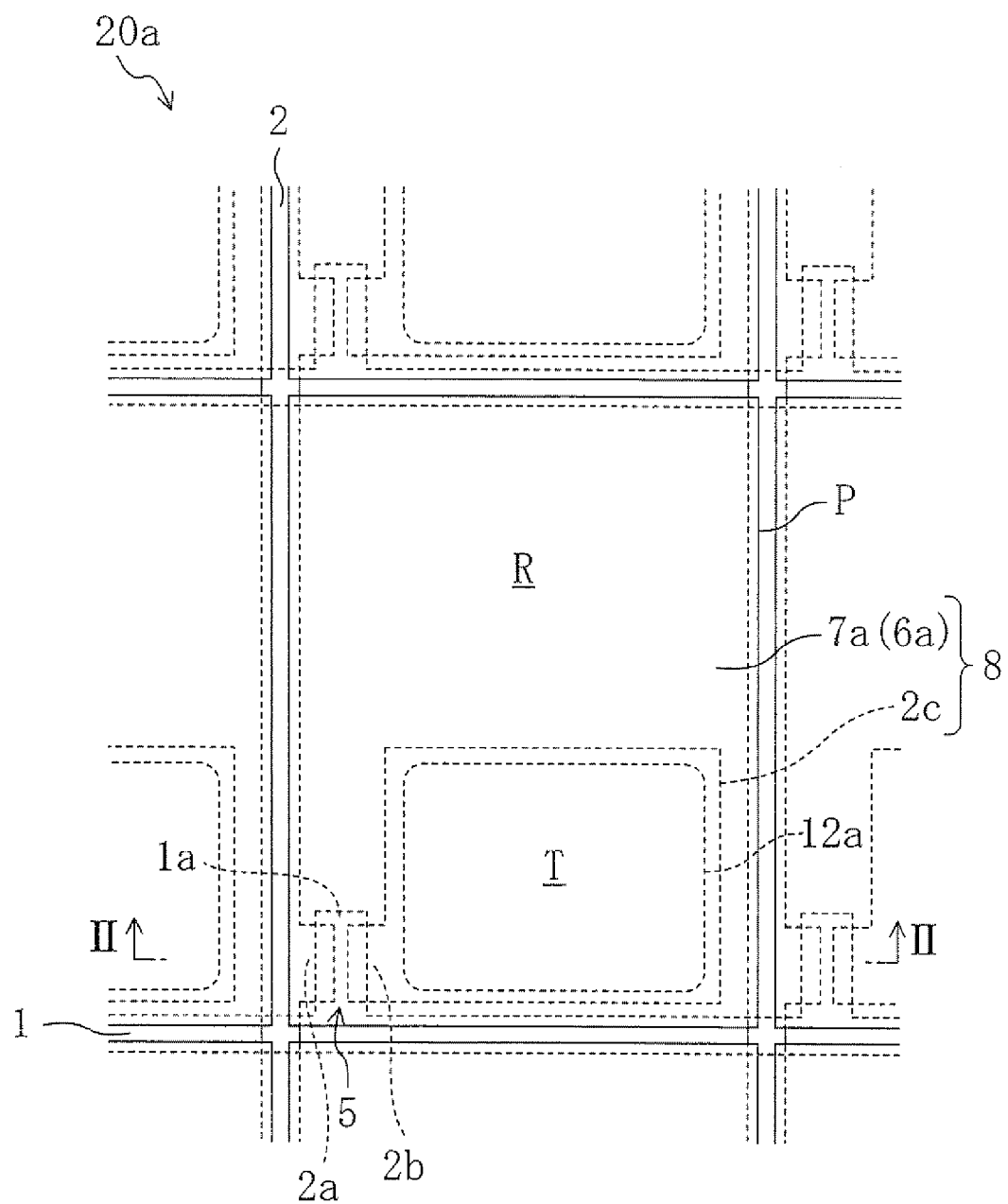
FIG. 1 is a plan view of an active matrix substrate $20a$ of a semi-transmissive liquid crystal display device according to a first embodiment.

C1, C2 opening
E outer peripheral end
P pixel
R reflective region
T transmissive region
2 source line
2c first transparent electrode
5 TFT (switching element)
6 reflective conductive film
6a reflective electrode
6aa molybdenum layer (first metal layer, first metal film)
6ab aluminum layer (second metal layer, second metal film)
6b reflective conductive layer
7 transparent conductive film
7a second transparent electrode
10a insulating substrate
12 insulating layer
12a opening
20a, 20b, 20ca-cd, 20da, 20db active matrix substrate
25 liquid crystal layer
30a, 30b counter substrate
50a, 50b semi-transmissive liquid crystal display device

BEST MODE FOR CARRYING OUT THE INVENTION

Hereinafter, embodiments of the invention will be described in detail with reference to the accompanying drawings. Note that the invention is not limited to the embodiments described below.

First Embodiment

FIGS. 1 through 17 show a first embodiment of a semi-transmissive liquid crystal display device according to the invention. FIG. 1 is a plan view of an active matrix substrate 20a of a semi-transmissive liquid crystal display device 50a of this embodiment, and FIG. 2 is a cross-sectional view of the semi-transmissive liquid crystal display device 50a taken along line II-II in FIG. 1.

Figure 2:
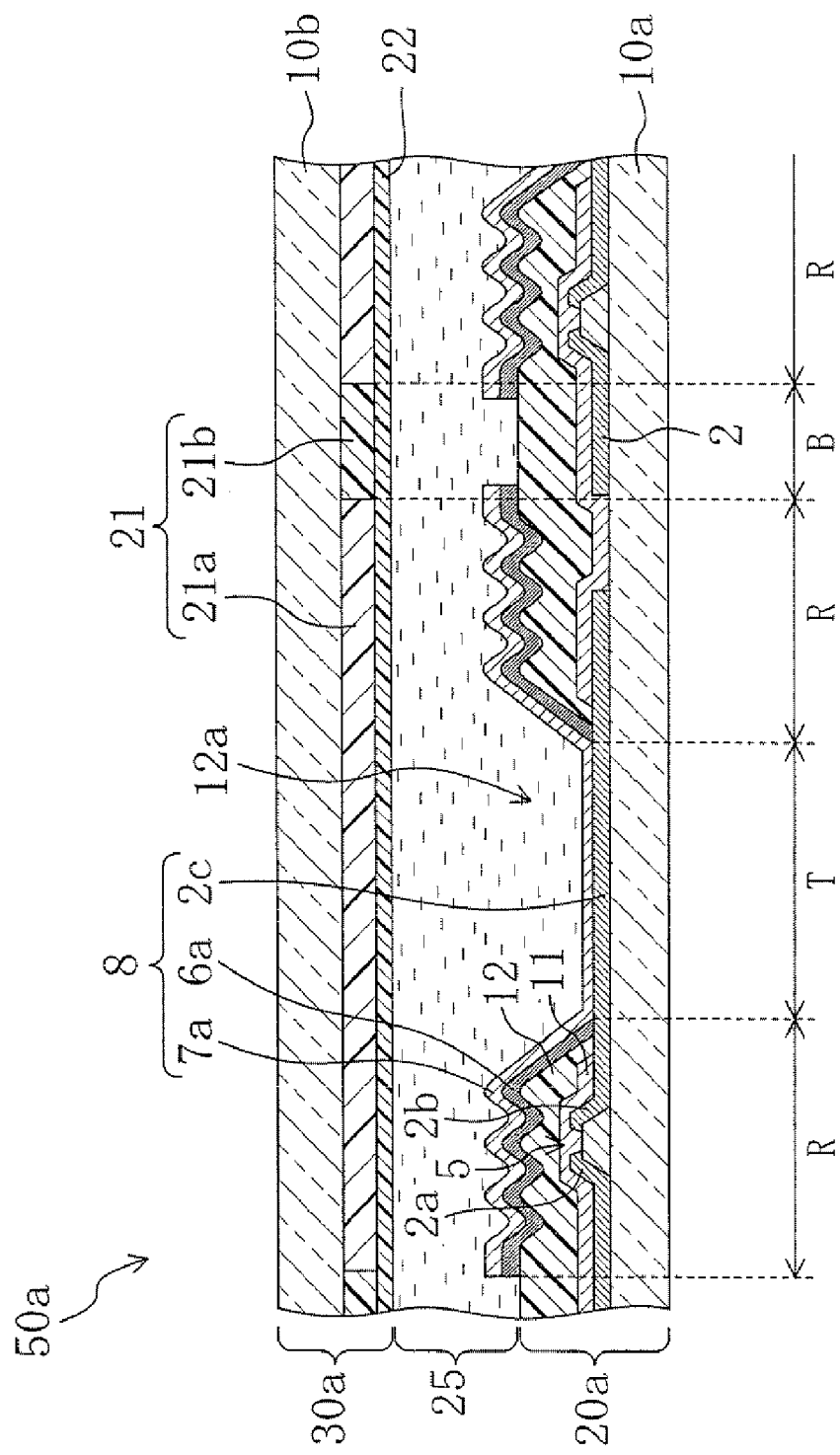
FIG. 2 is a cross-sectional view of a semi-transmissive liquid crystal display device $50a$ of the first embodiment taken along line II-II in FIG. 1.
Figure 3:
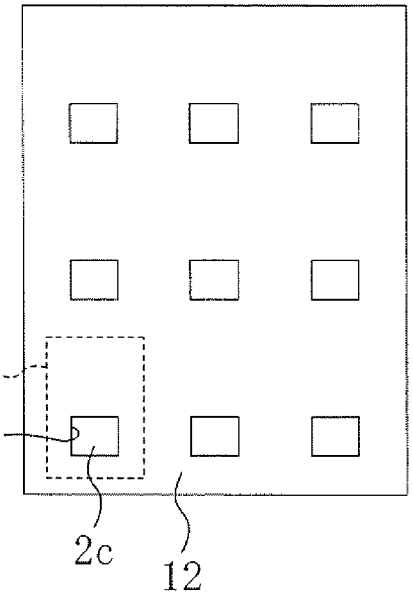
FIG. 3 is a plan view of a substrate $20a_1$ illustrating a fabrication process of the active matrix substrate $20a$.

As shown in FIG. 2, the semi-transmissive liquid crystal display device 50a includes an active matrix substrate 20a and a counter substrate 30a which are provided so as to face each other, and a liquid crystal layer 25 provided between the substrates 20a and 30a.

As shown in FIG. 1, the active matrix substrate 20a includes gate lines 1 extending in parallel with each other, source lines 2 extending in parallel with each other in a direction perpendicular to the gate lines 1, thin film transistors (TFTs) 5 provided at each intersection of the gate lines 1 and the source lines 2 as switching elements, and pixel electrodes 8 provided in each display region (pixel P) surrounded by a pair of adjacent gate lines 1 and a pair of adjacent source lines 2. Each pixel electrode 8 includes a reflective electrode 6a that forms a reflective region R for providing reflection mode display, a portion that forms a transmissive region T exposed from the reflective electrode 6a in a first transparent electrode 2c for providing transmission mode display, and a second transparent electrode 7a that is described later. Note that, although not shown in FIG. 1, the active matrix substrate 20a may include capacitor lines extending in parallel with each other between the gate lines 1.

As shown in FIG. 1, each TFT 5 includes a gate electrode 1a that is a protruding portion of the gate electrode 1, a gate insulating film (not shown) provided so as to cover the gate electrode 1a, a semiconductor layer (not shown) provided with an island shape at a position corresponding to the gate electrode 1a on the gate insulating film, and a source electrode 2a as a protruding portion of a source line 2 and a drain electrode 2b which are provided so as to face each other on the semiconductor layer. Note that an extended portion of the drain electrode 2b is a first transparent electrode 2c.

The active matrix substrate 20a has a multi-layered structure in which a gate insulating film, a protective insulating film 11, and an interlayer insulating film 12 are sequentially formed on an insulating substrate 10a.

The gate line 1 and the gate electrode 1a are provided between the insulating substrate 10a and the gate insulating film.

A semiconductor layer is provided between the gate insulating film and the protective insulating film 11, and the source line 2, the source electrode 2a, and the drain electrode 2b are provided on the semiconductor layer.

The reflective electrode 6a and the second transparent electrode 7a which are connected to the drain electrode 2b (first transparent electrode 2e) are formed on the protective insulating film 11 and the interlayer insulating film 12. The second transparent electrode 7a overlaps the reflective electrode 6a and the first transparent electrode 2c exposed from the reflective electrode 6a, and is connected to the reflective electrode 6a and the first transparent electrode 2c. In order to compensate for the phase difference between the reflective region R and the transmissive region T, the sum of the respective thicknesses of the protective insulating film 11 and the interlayer insulating films 12 that form an insulating layer is set so that the thickness of the liquid crystal layer 25 in the reflective region R becomes substantially one half of the thickness of the liquid crystal layer 25 in the transmissive region T. Moreover, since the interlayer insulating film 12 has a convexo-concave surface, the reflective electrode 6a formed on the interlayer insulating film 12 also has a convexo-concave surface, whereby light that is incident on the reflective electrode 6a can be diffused as appropriate.

As shown in FIG. 1, the reflective electrode 6a is provided around the transmissive region T (a portion exposed from the reflective electrode 6a in the first transparent electrode 2c), and a stepped portion is formed by the interlayer insulating film 12 in a boundary region between the reflective region R and the transmissive region T. Therefore, the reflective electrode 6a is connected to the first transparent electrode 2c through the stepped portion of the interlayer insulating film 12. An outer peripheral end E of the reflective electrode 6a is aligned with an outer peripheral end E of the second transparent electrode 7a.

An alignment film (not shown) is provided on the second transparent electrode 7a.

The counter substrate 30a is a multi-layered structure in which a color filter layer 21, an overcoat layer (not shown), a common electrode 22, and an alignment film (not shown) are sequentially formed on an insulating substrate 10b. Note that, although not shown in FIG. 2, a rivet protruding toward the liquid crystal layer 30 is provided for every reflective region R and every transmissive region T of each pixel in the counter substrate 30a.

The color filter layer 21 includes a black matrix 21b provided so as to overlap the gate lines 1 and source lines 2 of the active matrix substrate 20a, and a colored layer 21a provided in each gap of the black matrix 21b so as to correspond to each pixel electrode 8 of the active matrix substrate 20a and colored with red, green, or blue. A region overlapping the black matrix 21b between the pixel electrodes 8 is a black matrix region B.

The liquid crystal layer 25 is a nematic liquid crystal having electro-optic properties and includes liquid crystal molecules of $\Delta\in$ (dielectric anisotropy)<0. It is therefore considered that, when no voltage is applied to the liquid crystal layer 25, only the liquid crystal molecules near each rivet are oriented so as to be radially tilted around the rivet and the other liquid crystal molecules far from each rivet are oriented substantially vertically to the substrate surface. It is also considered that, when a voltage is applied to the liquid crystal layer 25, the liquid crystal molecules far from each rivet are also oriented so as to correspond to the radially tilted orientation. Such orientation of the liquid crystal molecules widens a viewing angle in image display.

The semi-transmissive liquid crystal display device 50a is structured so that light entering from the side of the counter substrate 30a is reflected by the reflective electrode 6a in the reflective region R and light emitted from a backlight and entering from the side of the active matrix substrate 20a transmits through the transmissive region T. In the semi-transmissive liquid crystal display device 50a, when a gate signal is transmitted from the gate line 1 to the gate electrode 1a and the TFT 5 is turned on in each pixel, a source signal is transmitted from the source line 2 to the source electrode 2a and predetermined charges are written to the pixel electrode 8 through the semiconductor layer and the drain electrode 2b. At this time, a potential difference is produced between each pixel electrode 8 of the active matrix substrate 20a and the common electrode 22 of the counter substrate 30a, and a predetermined voltage is applied to the liquid crystal layer 25. By changing the orientation state of the liquid crystal molecules by the magnitude of the voltage applied to the liquid crystal layer 25, the light transmittance of the liquid crystal layer 25 is adjusted and an image is displayed.

In order to prevent image burn-in, the semi-transmissive liquid crystal display device 50a is AC-driven by alternately applying a positive voltage and a negative voltage to the liquid crystal layer 25 by inverting the potential of the pixel electrodes 8 at every prescribed period. Therefore, the potential of the common electrode 22 is set to an optimal counter potential Vcom so that positive and negative voltages that are applied to the liquid crystal layer 25 become effectively equal to each other.

Hereinafter, a method for manufacturing the semi-transmissive liquid crystal display device 50a according to this embodiment will be described in detail with reference to FIGS. 3 through 9. FIGS. 3 through 9 are plan views showing a substrate surface in each step of a fabrication process of an active matrix substrate. Note that the manufacturing method of this embodiment includes an active matrix substrate fabrication process, a counter substrate fabrication process, and a liquid crystal display device fabrication process.

[Active Matrix Substrate Fabrication Process]

First, a metal film such as titanium is formed with a thickness of about 3,000 Å on the whole surface of an insulating substrate 10a such as a glass substrate by a sputtering method. The metal film is then patterned by photolithography technology (Photo Engraving Process; hereinafter, referred to as "PEP technology") to form gate lines 1 and gate electrodes 1a.

Thereafter, a silicon nitride film or the like is formed with a thickness of about 3,000 Å by a CVD (Chemical Vapor Deposition) method on the whole substrate having the gate lines 1 and the gate electrodes 1a formed thereon, whereby a gate insulating film is formed.

An intrinsic amorphous silicon film (thickness: about 1,500 Å) and a phosphorus-doped n+ amorphous silicon film (thickness: about 500 Å) are successively formed by a CVD method on the whole substrate on the gate insulating film, and are then patterned into an island shape on the gate electrodes 1a by PEP technology. A semiconductor layer made of the intrinsic amorphous silicon film and the n+ amorphous silicon layer is thus formed.

A transparent conductive film made of an ITO film, a compound of indium oxide and tin oxide, is then formed with a thickness of about 1,400 Å by a sputtering method on the whole substrate on the gate insulating film having the semiconductor layer formed thereon. The transparent conductive film is then patterned by PEP technology to form source lines 2, source electrodes 2a, drain electrodes 2b, and first transparent electrodes 2c (a first transparent electrode formation step).

Thereafter, a channel portion is formed by etching away the n+ amorphous silicon layer of the semiconductor layer by using the source electrodes 2a and the drain electrodes 2b as a mask. TFTs 5 are thus formed.

A silicon nitride film or the like is then formed with a thickness of about 3,000 Å on the whole substrate on the source electrodes 2a and the drain electrodes 2b by using a CVD method. The silicon nitride film is then patterned by PEP technology so as to cover the TFTs 5. A protective insulating film 11 is thus formed.

A photosensitive acrylic resin or the like is then applied with a thickness of about 1.8 µm on the whole substrate on the protective insulating film 11, and is patterned by PEP technology so as to cover the protective insulating film 11. An interlayer insulating film 12 having an opening 12a in each pixel (formation portion) P is thus formed as shown in a substrate $20a_1$ of FIG. 3 (an insulating layer formation step).

Figure 4:
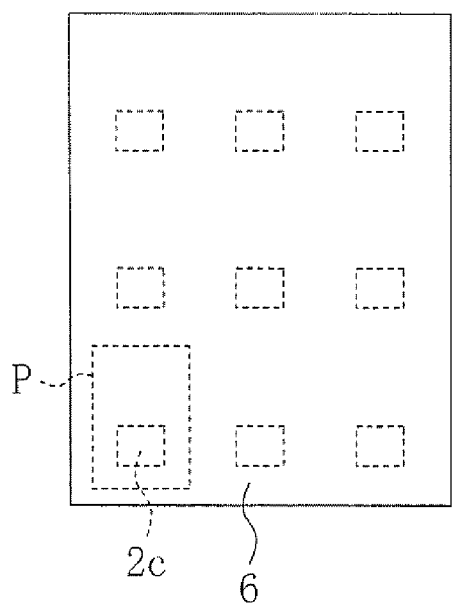
FIG. 4 is a plan view of a substrate $20a_2$ illustrating a fabrication process of the active matrix substrate $20a$.

Thereafter, as shown in a substrate $20a_2$ of FIG. 4, a molybdenum film (thickness: about 500 Å) as a first metal film and an aluminum film (thickness: about 1,000 Å) as a second metal film are sequentially formed by a sputtering method on the whole substrate on the interlayer insulating layer 12 to form a reflective conductive film 6 (a reflective conductive film formation step).

Figure 5:
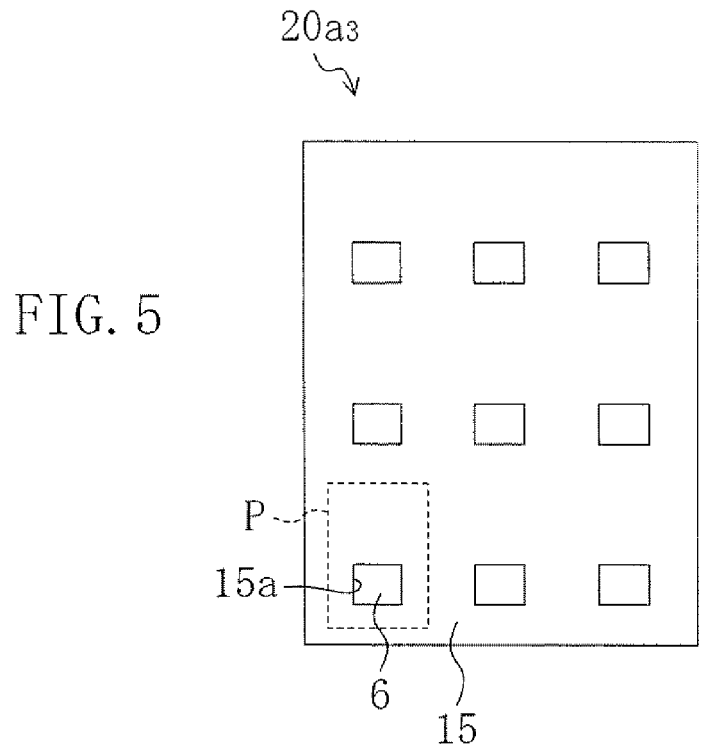
FIG. 5 is a plan view of a substrate $20a_3$ illustrating a fabrication process of the active matrix substrate $20a$.

After a photosensitive resin is applied to the whole substrate on the reflective conductive film 6, a resist pattern 15 having an opening 15a in each pixel (formation portion) P corresponding to the respective opening 12a in the interlayer insulating film 12 is formed as shown in a substrate $20a_3$ of FIG. 5.

Figure 6:
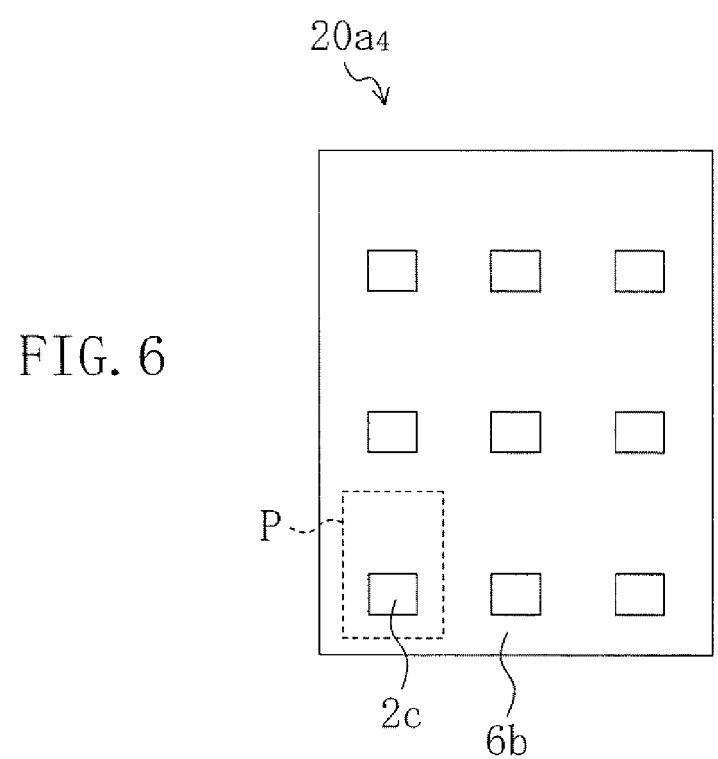
FIG. 6 is a plan view of a substrate $20a_4$ illustrating a fabrication process of the active matrix substrate $20a$.

The substrate 20a3 is then wet-etched with, for example, a mixed solution of nitric acid, phosphoric acid, and acetic acid through the resist pattern 15 to form a reflective conductive layer 6b having the first transparent electrodes 2c exposed in a portion corresponding to the respective openings 15a of the resist pattern 15, as shown in a substrate $20a_4$ of FIG. 6 (a first etching step). The molybdenum film is interposed between the aluminum film of the reflective conductive layer 6b and the ITO film of the first transparent electrodes 2c. Therefore, electric corrosion (electrocorrosion) due to formation of a local battery between the aluminum film and the ITO film can be prevented when the aluminum film is developed by PEP technology.

Figure 7:
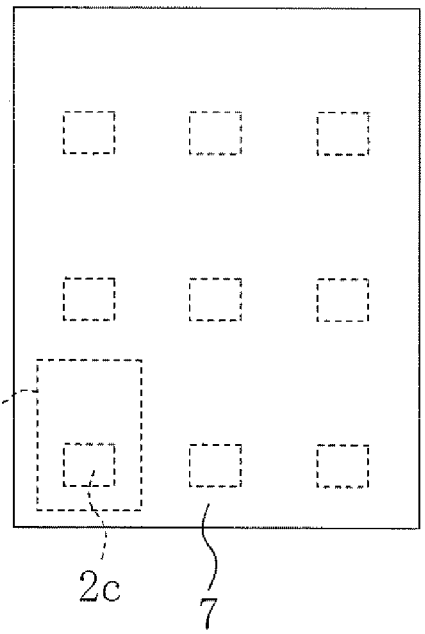
FIG. 7 is a plan view of a substrate $20a_5$ illustrating a fabrication process of the active matrix substrate $20a$.

Thereafter, as shown in a substrate $20a_5$ of FIG. 7, a transparent conductive film 7 made of an IZO (Indium Zinc Oxide) film is formed with a thickness of 50 Å to 300 Å (preferably, about 100 Å) by a sputtering method on the whole substrate on the reflective conductive layer 6b (a transparent conductive film formation step). In addition to the IZO film, an AZO (Aluminum Zinc Oxide) film, a GZO (Gallium Zinc Oxide) film, and the like may be used as the transparent conductive film 7.

Figure 8:
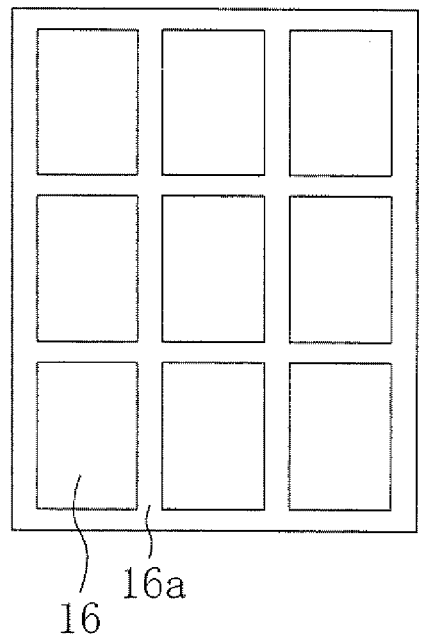
FIG. 8 is a plan view of a substrate $20a_6$ illustrating a fabrication process of the active matrix substrate $20a$.

After a photosensitive resin is applied to the whole substrate on the transparent conductive film 7, a resist pattern 16 having an opening 16a between the pixels (formation portions) P is formed as shown in a substrate 20a6 of FIG. 8.

Figure 9:
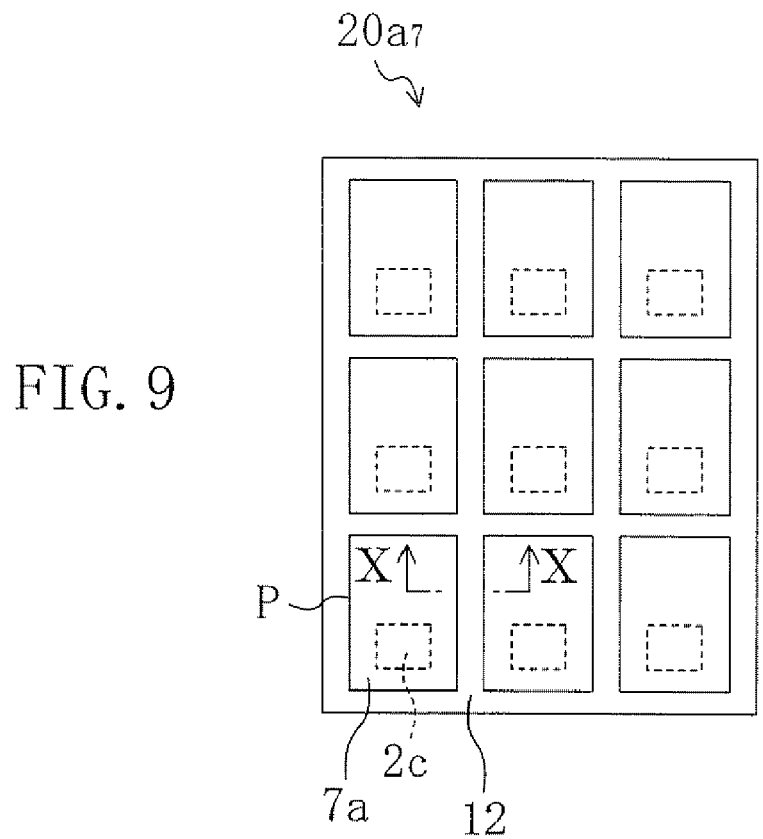
FIG. 9 is a plan view of a substrate $20a_7$ illustrating a fabrication process of the active matrix substrate $20a$.
Figure 10:
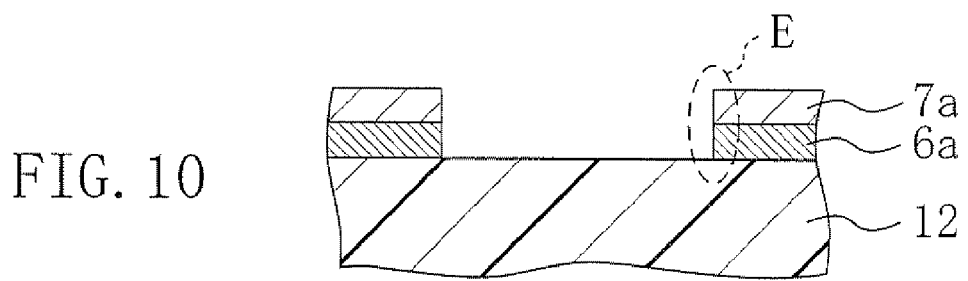
FIG. 10 is a cross-sectional view taken along line X-X in FIG. 9.

The substrate $20a_6$ is then wet-etched with, for example, a mixed solution of nitric acid, phosphoric acid, and acetic acid through the resist pattern 16 to form reflective electrodes 6a and second transparent electrodes 7a with the interlayer insulating film 12 exposed in a portion corresponding to the openings 16a of the resist pattern 16, as shown in a substrate 20a7 of FIG. 9 (a second etching step). As shown in a cross-sectional view of FIG. 10, an outer peripheral end E of the second transparent electrode 7a is aligned with an outer peripheral end E of the reflective electrode 6a. Note that "the outer peripheral end E of the second transparent electrode 7a is aligned with the outer peripheral end E of the reflective electrode 6a" means that the difference between the outer peripheral end E of the second transparent electrode 7a and the outer peripheral end E of the reflective electrode 6a is within ±0.2 μm by simultaneously etching the transparent conductive film 7 and the reflective conductive film 6b.

In a conventional manufacturing method, on the other hand, an outer peripheral end of a reflective conductive layer (6b) is also patterned in the first etching step, and alignment with respect to the patterned outer peripheral end of the reflective conductive layer (6b) is required in the second etching step to form the second transparent electrodes. This increases an alignment error, and the difference between the outer peripheral end of the second transparent electrode (7a) and the outer peripheral end of the reflective electrode (6a) becomes ±2.0 μm or more.

Finally, a polyimide resin is applied to the whole substrate on the second transparent electrodes 7a to form an alignment film.

The active matrix substrate 20a can thus be fabricated.

Note that a method of forming the semiconductor layer from an amorphous silicon film is shown in the above fabrication process of the active matrix substrate 20a. However, the semiconductor layer may be formed from a polysilicon film, and an amorphous silicon film and a polysilicon film may be laser-annealed to improve a crystalline property.

[Counter Substrate Fabrication Process]

First, a chromium thin film is formed on the whole surface of an insulating substrate 10b such as a glass substrate and then patterned by PEP technology to form a black matrix 21b.

Thereafter, a colored layer 21a colored with red, green, or blue is patterned in each gap of the black matrix 21b to form a color filter layer 21.

An acrylic resin is then applied to the whole substrate on the color filter layer 21 to form an overcoat layer.

An ITO film is formed with a thickness of about 1,000 Å on the whole substrate on the overcoat layer to form a common electrode 22.

Finally, a polyimide resin is applied to the whole substrate on the common electrode 22 to form an alignment film.

The counter substrate 30a can thus be fabricated.

[Liquid Crystal Display Device Fabrication Process]

First, a sealing material such as a thermosetting epoxy resin is applied to one of the active matrix substrate 20a and the counter substrate 30a by a screen printing method so as to have a frame pattern missing a portion corresponding to a liquid crystal injection port. Spherical resin or silica spacers having a diameter corresponding to the thickness of the liquid crystal layer 25 are dispersed onto the other substrate.

Thereafter, the active matrix substrate 20a and the counter substrate 30a are bonded to each other and the sealing material is cured to form an empty cell.

A liquid crystal material is injected between the active matrix substrate 20a and the counter substrate 30a of the empty cell to form a liquid crystal layer 25. The liquid crystal layer 25 has a thickness of about 2 μm in the reflective region R and about 4 μm in the transmissive region T.

Finally, after a UV curable resin is applied to the liquid crystal injection port, the liquid crystal injection port is sealed by UV radiation.

The semi-transmissive liquid crystal display device 50a of this embodiment can thus be manufactured.

Hereinafter, experiments conducted will be specifically described.

First, a flicker measuring method will be described with reference to FIG. 12.

Figure 12:
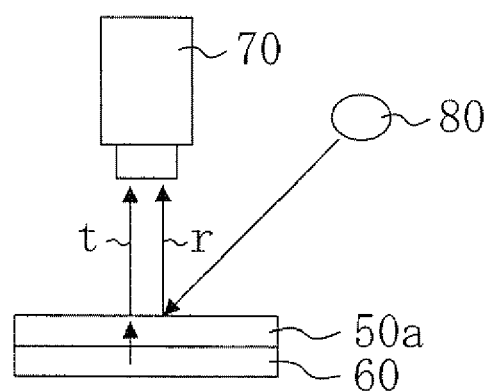
FIG. 12 is a diagram illustrating a flicker measuring method.
Figure 13:
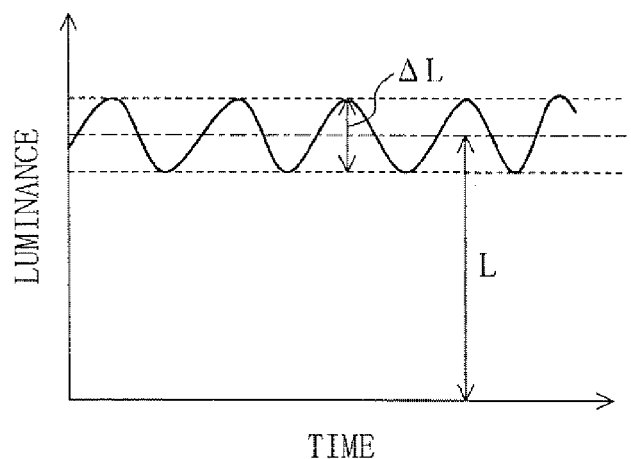
FIG. 13 is a graph showing an example of a measured flicker waveform.

In flicker measurement, as shown in FIG. 12, a backlight 60 is provided under the semi-transmissive liquid crystal display device 50a, a fluorescent lamp 80 is provided obliquely above the semi-transmissive liquid crystal display device 50a, and a flicker measuring device 70 (for example, Multimedia Display Tester 3298F made by Yokogawa Electric Corporation) is provided above the semi-transmissive liquid crystal display device 50a. Light from the backlight 60 (or the fluorescent lamp 80) is emitted to the semi-transmissive liquid crystal display device 50a, and a halftone image signal is applied to each pixel electrode 8 of the active matrix substrate 20a and a predetermined counter potential Vcom is applied to the common electrode 22 of the counter substrate 30a, whereby the luminance of transmitted light t (or reflected light r) from the semi-transmissive liquid crystal display device 50a is measured by the flicker measuring device 70. As a result, a flicker waveform as shown in FIG. 13 is obtained. An average luminance L and a flicker amplitude ΔL are calculated, and a flicker ratio at a predetermined counter potential Vcom is calculated by the formula: flicker ratio (%)=ΔL/L.

Figure 14:
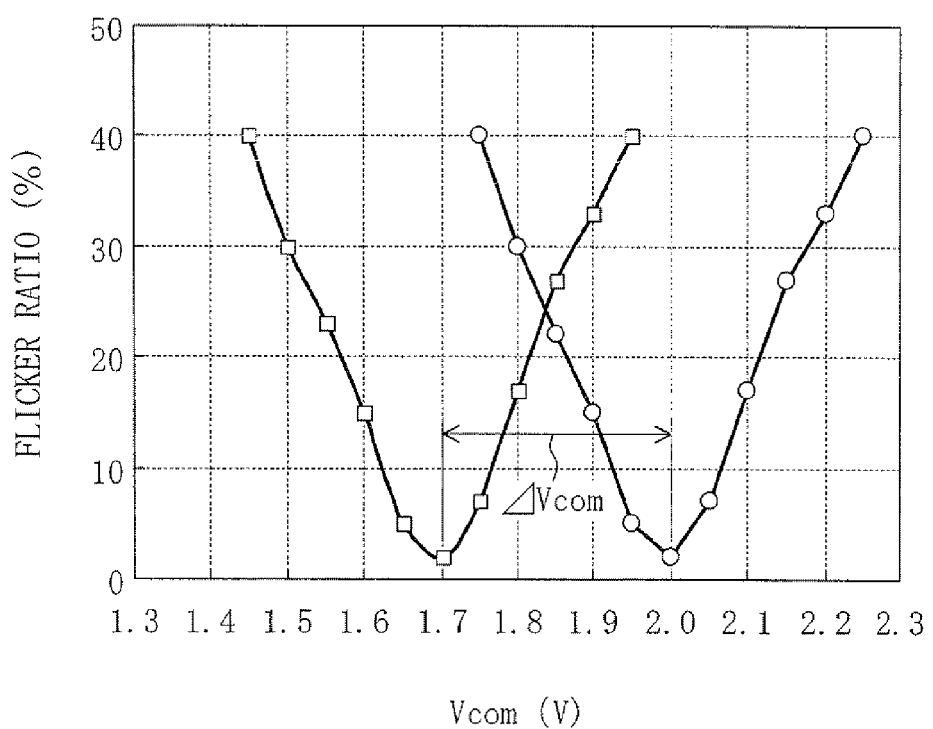
FIG. 14 is a graph showing the relation between Vcom and flicker ratio.

As shown in FIG. 14, in the flicker measurement, a counter voltage Vcom of 1.75 V to 2.25 V and 1.45 V to 1.95 V is respectively applied in the transmission mode display using incident light from the backlight 60 and the reflection mode display using incident light from the fluorescent lamp 80. Note that, in FIG. 14, the circles show a flicker ratio in the transmission mode, and the squares show a flicker ratio in the reflection mode. The difference ΔVcom between Vcom corresponding to the lowest flicker ratio in the transmission mode and Vcom corresponding to the lowest flicker ratio in the reflection mode is a flicker voltage difference. Note that it is considered that the smaller the flicker voltage difference ΔVcom is, the more generation of flicker is suppressed.

Figure 11:
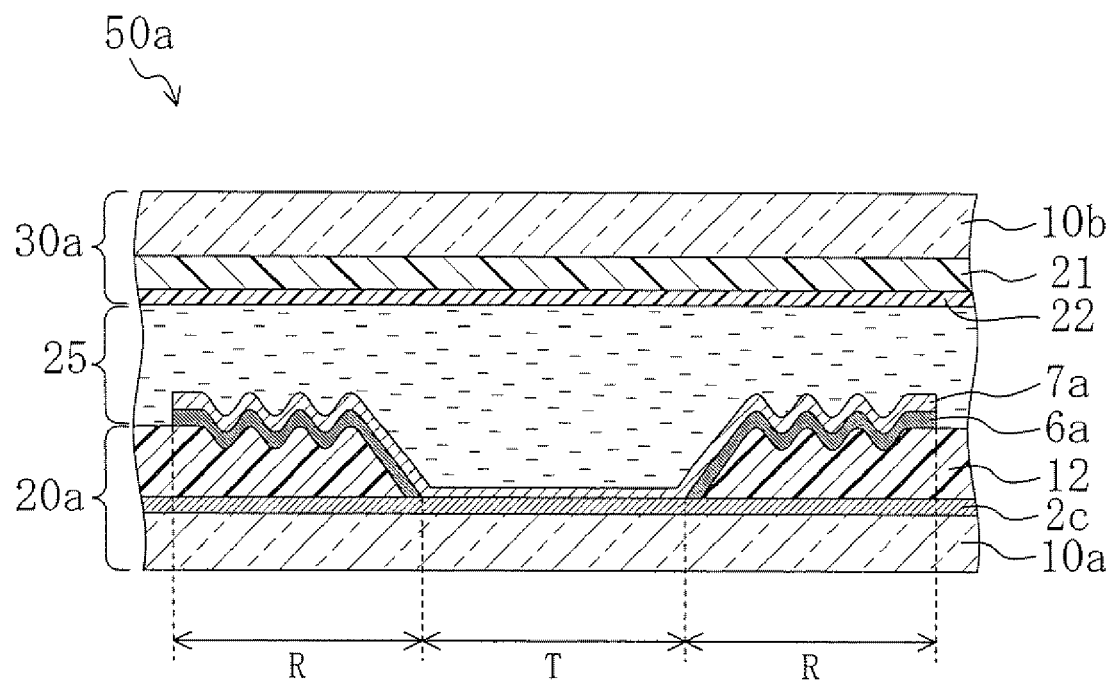
FIG. 11 is a schematic cross-sectional view schematically showing the semi-transmissive liquid crystal display device $50a$ of FIG. 2.
Figure 40:
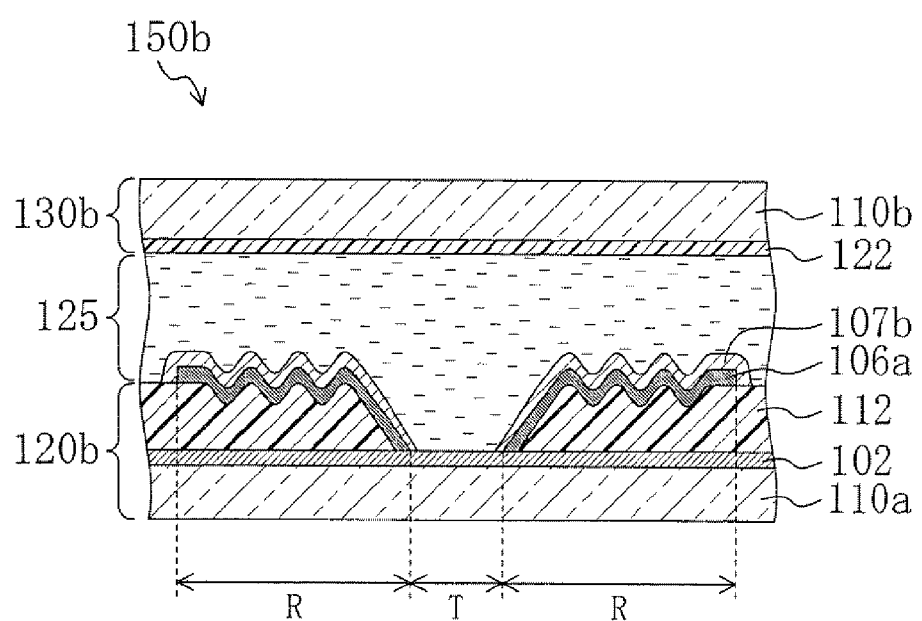
FIG. 40 is a schematic cross-sectional view of a conventional semi-transmissive liquid crystal display device 150b.

Semi-transmissive liquid crystal display devices were fabricated by the same method as that of the above embodiment and a flicker voltage difference ΔVcom was measured. More specifically, as shown in FIG. 11, semi-transmissive liquid crystal display devices 50a having an active matrix substrate 20a in which the thickness of an IZO film of the second transparent electrodes 7a is 50 Å to 300 Å (400 Å) were fabricated as an example of the invention, and as shown in FIG. 40, semi-transmissive liquid crystal display devices 150b having an active matrix substrate 120b in which the thickness of an IZO film of the second transparent electrodes 107b is 50 Å to 400 Å were fabricated as a comparative example of the invention, and each flicker voltage difference ΔVcom was measured. Note that FIG. 11 is a cross-sectional view schematically showing the semi-transmissive liquid crystal display device 50a of FIG. 2.

Figure 15:
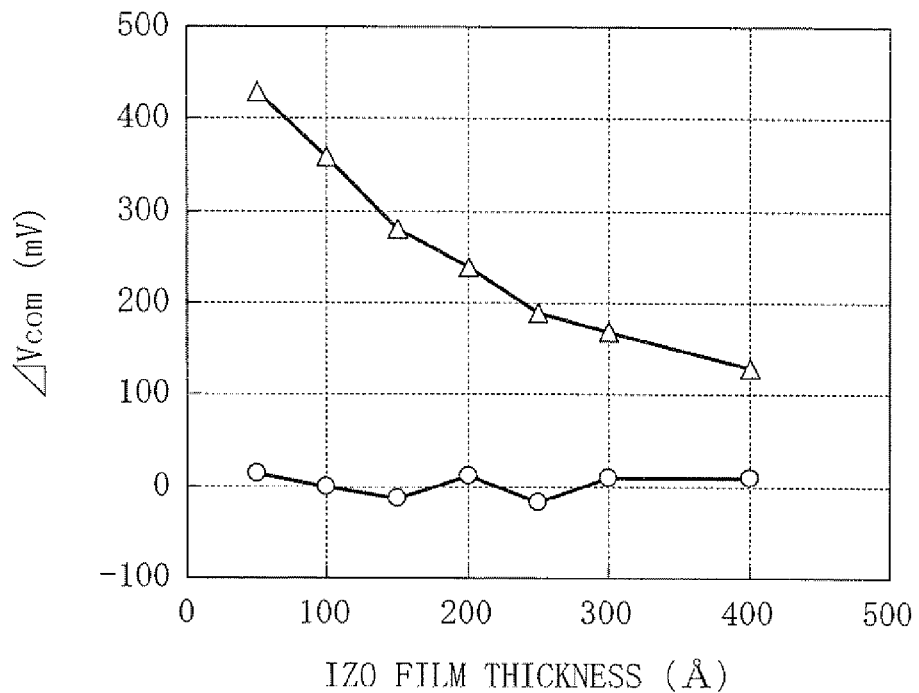
FIG. 15 is a graph showing the relation between IZO film thickness and ΔVcom.

Hereinafter, the measurement result of the flicker voltage difference ΔVcom will be described with reference to FIG. 15.

In the example of the invention, as shown by the circles in the figure, the flicker voltage difference ΔVcom is around 0 mV regardless of the thickness of the IZO film, and generation of flicker was not confirmed.

In the comparative example of the invention, as shown by the triangles in the figure, the flicker voltage difference ΔVcom tends to decrease with an increase in the thickness of the IZO film. In the comparative example, the flicker voltage difference ΔVcom decreased only to about 120 mV and generation of flicker was confirmed. This is because the difference in work function between the reflective region R and the transmissive region T is 0.1 eV (=4.9 eV–4.8 eV).

The reflectance in the reflective region R was measured in each semi-transmissive liquid crystal display device fabricated as the example of the invention.

Figure 16:
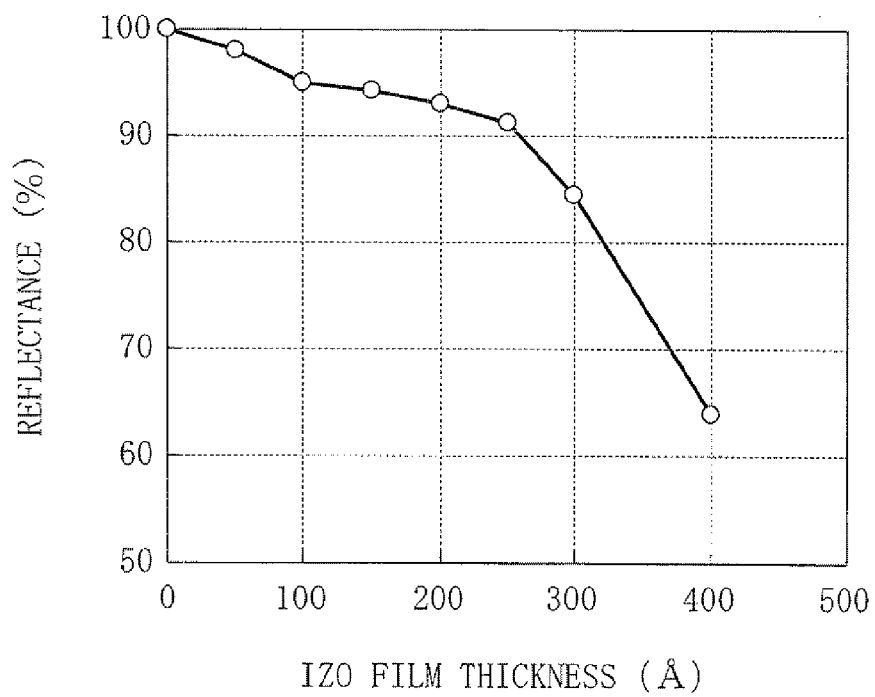
FIG. 16 is a graph showing the relation between IZO film thickness and reflectance.

As shown in FIG. 16, in each semi-transmissive liquid crystal display device of the example of the invention, the reflectance was reduced with an increase in the thickness of the IZO film. The reflectance was significantly reduced when the thickness of the IZO film exceeds 300 Å. Note that, when the thickness of the IZO film is less than 50 Å, the reflectance is high, but conduction between the first transparent electrode formed below the second transparent electrode and the reflective electrode may become defective.

Accordingly, an appropriate thickness of the IZO film of the second transparent electrodes is in the range of 50 Å to 300 Å in view of the measurement result of the flicker voltage difference ΔVcom, the measurement result of the reflectance, and the like.

As has been described above, according to the semi-transmissive liquid crystal display device 50a of this embodiment, the reflective electrode 6a is connected to the first transparent electrode 2c through the opening 12a of the interlayer insulating film 12, and the second transparent electrode 7a overlaps the reflective electrode 6a and the region exposed from the reflective electrode 6a in the first transparent electrode 2c and is connected to the reflective electrode 6a and the first transparent electrode 2c. Therefore, the reflective electrode 6a and the second transparent electrode 7a are connected to the first transparent electrode 2c. Therefore, normal conduction between the reflective electrode 6a and the first transparent electrode 2c can be maintained even if the thickness of the transparent electrode 7a is reduced. Therefore, the second transparent electrode 7a can be formed with a small thickness, and a high reflectance can be maintained in the reflective region R. Moreover, in the reflective region R and the transmissive region T, the second transparent electrode 7a is provided on the side of the liquid crystal layer 25. Therefore, each electrode material on the side of the liquid crystal layer 25 in the reflective region R and the transmissive region T has the same work function, whereby generation of flicker can be suppressed.

Moreover, the respective outer peripheral ends E of the reflective electrode 6a and the second transparent electrode 7a on the interlayer insulating film 12 are aligned with each other in each pixel. This structure can suppress variation in overlap width between each source line 2 provided between the pixels P and the respective outer peripheral ends E of the reflective electrode 6a and the second transparent electrode 7a through the insulating layer formed by the protective insulating film 11 and the interlayer insulating film 12, and therefore can suppress variation in parasitic capacitance Csd between the source line 2 and the reflective electrode 6a and second transparent electrode 7a.

The invention can thus provide a semi-transmissive liquid crystal display device in which normal conduction between a reflective electrode and a transparent electrode and a high reflectance are maintained and generation of flicker is suppressed as well as variation in parasitic capacitance between a source line and a reflective electrode and transparent electrode is suppressed.

Figure 17:
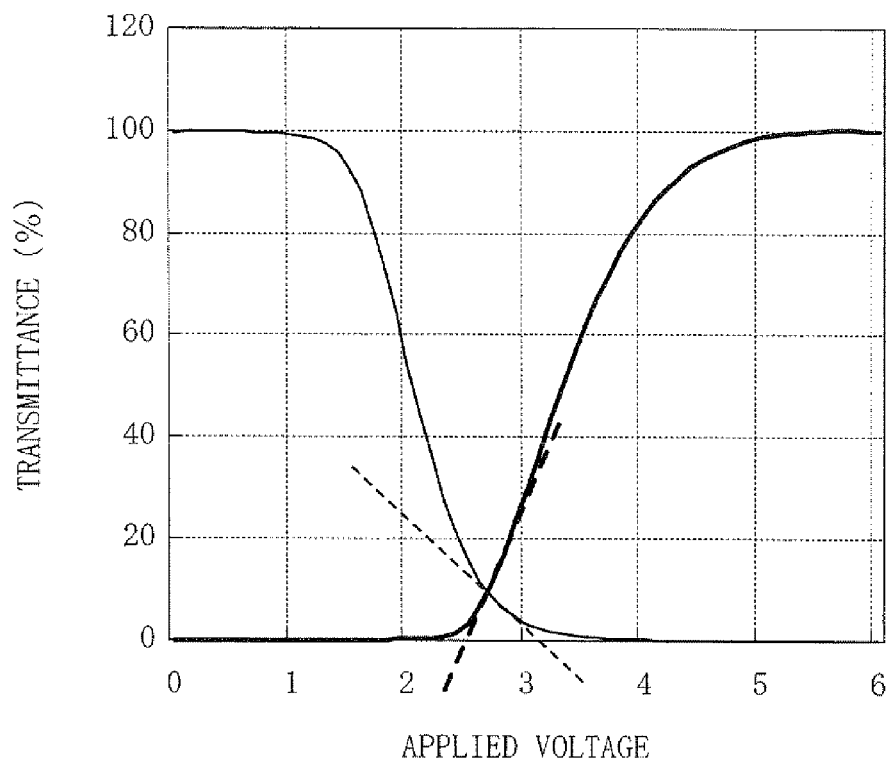
FIG. 17 is a graph showing the relation between applied voltage and transmittance.

A vertical alignment type semi-transmissive liquid crystal display device is described in the above embodiment. However, the invention is also applicable to a TN type semi-transmissive liquid crystal display device. As shown in FIG. 17, in the vertical alignment type semi-transmissive liquid crystal display device, a V-T curve of applied voltage (V) and transmittance (T) is steeper than a V-T curve of the TN type semi-transmissive liquid crystal display device in a low transmittance region (0% to 20%) in which non-uniform luminance is more likely to be visually recognized. It is therefore well known in the art that, in the vertical alignment type semi-transmissive liquid crystal display device, the luminance significantly changes with variation in applied voltage. Note that, in FIG. 17, the thick solid line indicates a V-T curve of the vertical alignment type liquid crystal display device and the thin solid line indicates a V-T curve of the TN type liquid crystal display device. Therefore, in such a vertical alignment type semi-transmissive liquid crystal display device as in the above embodiment, variation in parasitic capacitance Csd between the source line and the reflective electrode and transparent electrode is suppressed. Therefore, variation in applied voltage resulting from the variation in parasitic capacitance Csd is reduced. As a result, degradation in display quality can be more effectively suppressed as compared to the TN type semi-transmissive liquid crystal display device.

According to the semi-transmissive liquid crystal display device 50a of this embodiment, the second transparent electrode 7a serves as a redundant portion between the reflective electrode 6a and the first transparent electrode 2c. Therefore, defects in the pixel electrode 8 can be suppressed and reduction in manufacturing yield of the semi-transmissive liquid crystal display device can be suppressed.

According to the semi-transmissive liquid crystal display device 50a of this embodiment, the transparent conductive film 7 and the reflective conductive layer 6b are simultaneously etched in the second etching step and the respective outer peripheral ends E of the second transparent electrode 7a and the reflective electrode 6a are aligned with each other. Therefore, the reflective electrode 6a can be designed to have a large area. For example, in the semi-transmissive liquid crystal display device 50a of this embodiment, generation of flicker can be prevented by merely forming the outer peripheral end E of the second transparent electrode 7a on the outer peripheral end E of the reflective electrode 6a. Therefore, the reflective electrode 6a can be designed to have an area of up to 50% of the pixel P (transmissive region T: 30%). In the conventional semi-transmissive liquid crystal display device 150b, on the other hand, the reflective electrode 106a needs to be completely covered by the second transparent electrode 107b in order to prevent generation of flicker. Accordingly, the reflective electrode 106a has an area of up to 43% of the pixel P (transmissive region T: 30%).

Second Embodiment

The first embodiment of the invention may be structured as described below. Note that, in each of the embodiments shown below, the same elements as those of FIGS. 1 through 17 are denoted by the same reference numerals and characters, and detailed description thereof will be omitted.

Figure 18:
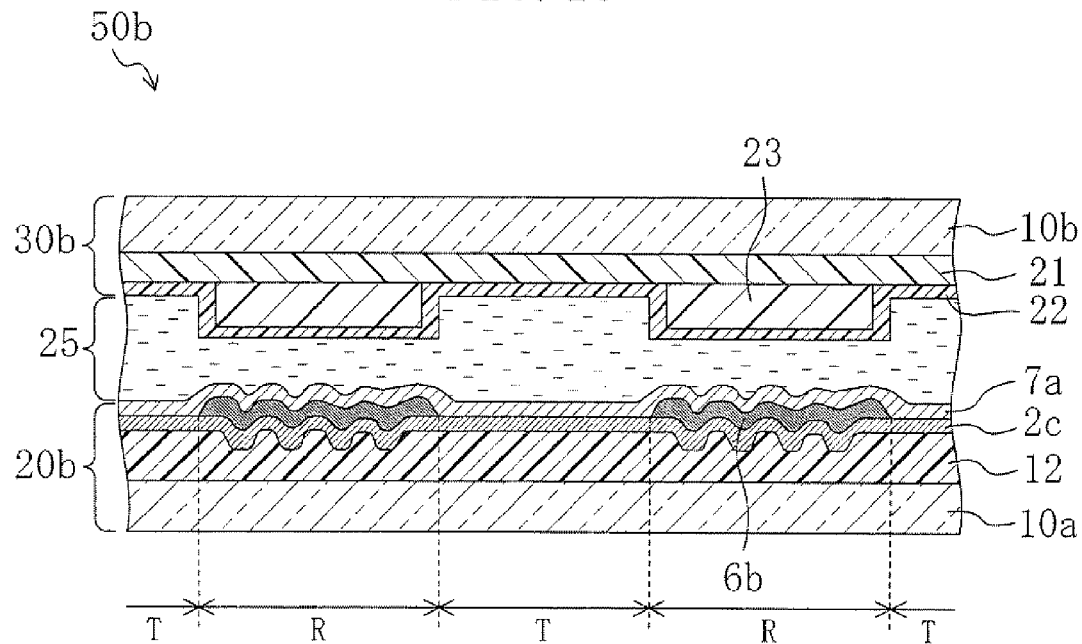
FIG. 18 is a schematic cross-sectional view of a semi-transmissive liquid crystal display device $50b$ according to a second embodiment.

FIG. 18 is a schematic cross-sectional view of a semi-transmissive liquid crystal display device 50b according to this embodiment, and this cross-sectional view corresponds to FIG. 11.

In the semi-transmissive liquid crystal display device 50b, a transparent layer 23 is provided in a reflective region R of a counter substrate 30b instead of the interlayer insulating film 12 provided in order to compensate for the phase difference between the reflective region R and the transmissive region T in the first embodiment.

Third Embodiment

Figure 19:
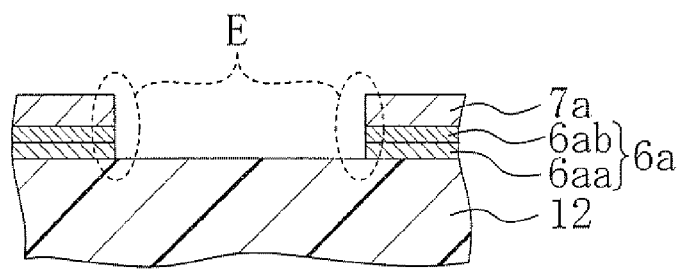
FIG. 19 is a first schematic cross-sectional view showing a region between pixels P of the active matrix substrate $20a$.
Figure 20:
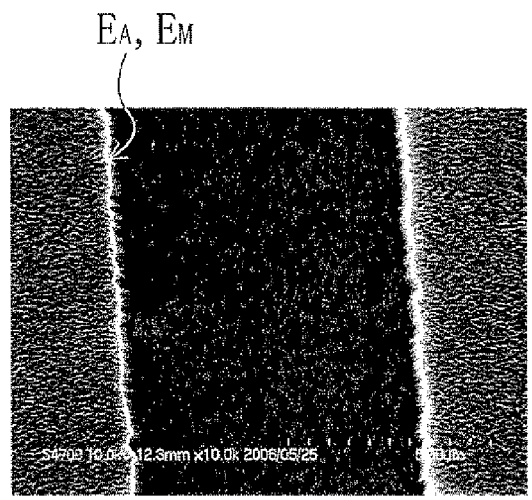
FIG. 20 is an SEM image showing the top surface of a region between pixels P of the active matrix substrate $20a$ corresponding to FIG. 19.
Figure 21:
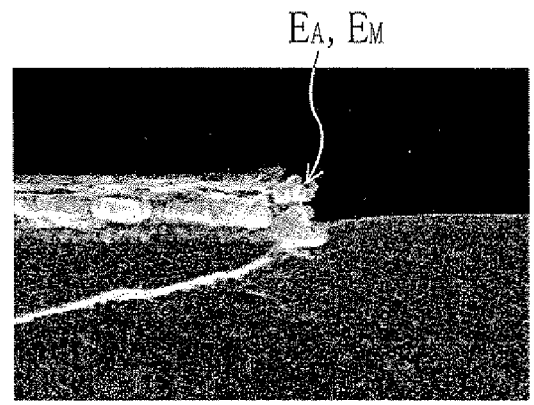
FIG. 21 is an SEM image showing a cross section of a region between pixels P of the active matrix substrate $20a$ corresponding to FIG. 19.
Figure 22:
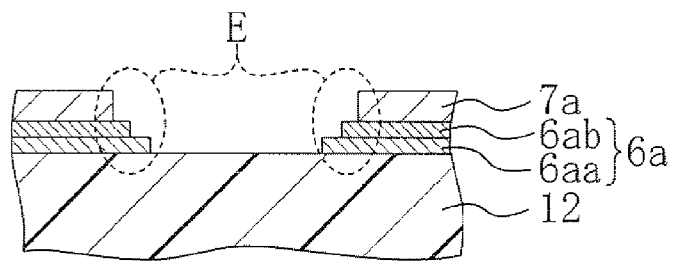
FIG. 22 is a second schematic cross-sectional view showing a region between pixels P of the active matrix substrate $20a$.
Figure 23:
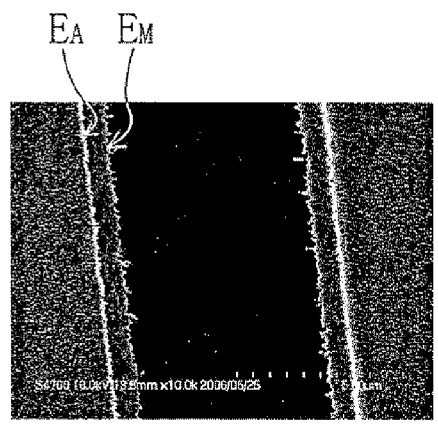
FIG. 23 is an SEM image showing the top surface of a region between pixels P of the active matrix substrate $20a$ corresponding to FIG. 22.
Figure 24:
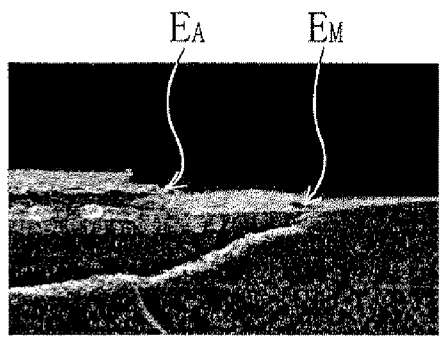
FIG. 24 is an SEM image showing a cross section of a region between pixels P of the active matrix substrate $20a$ corresponding to FIG. 22.

In the semi-transmissive liquid crystal display device 50a of the first embodiment, as shown in FIGS. 19 through 21, respective outer peripheral ends E of a molybdenum layer (first metal layer) 6aa formed by a molybdenum film, an aluminum layer (second metal layer) 6ab formed by an aluminum film, and a second transparent electrode 7a (for example, an outer peripheral end $E_M$ of the molybdenum layer 6aa and an outer peripheral end $E_A$ of the aluminum layer 6a) are aligned with each other on the interlayer insulating film 12 in a normal portion of the active matrix substrate 20a. In the substrate surface, however, as shown in FIGS. 22 through 24, the outer peripheral end $E_M$ of the molybdenum layer 6aa may include a portion protruding from the outer peripheral end $E_A$ of the aluminum layer 6ab. Therefore, there is room for improvement. FIGS. 19 and 22 are schematic cross-sectional views showing a gap between pixels P of the active matrix substrate 20a. FIGS. 20 and 23 are SEM (Scanning Electron Microscope) images showing the top surface of the active matrix substrate 20a between pixels P. FIGS. 21 and 24 are SEM images showing a cross section of the active matrix substrate 20a between the pixels P. If a protruding line width of the molybdenum layer 6aa from the aluminum layer 6ab varies in the substrate surface, the parasitic capacitance Csd varies in every pixel P or every plurality of pixels P, and the luminance may become non-uniform in halftone display. A method of making the protruding line width of the molybdenum layer 6aa from the aluminum layer 6ab constant in the substrate surface was considered in order to suppress generation of non-uniform luminance.

Figure 25:
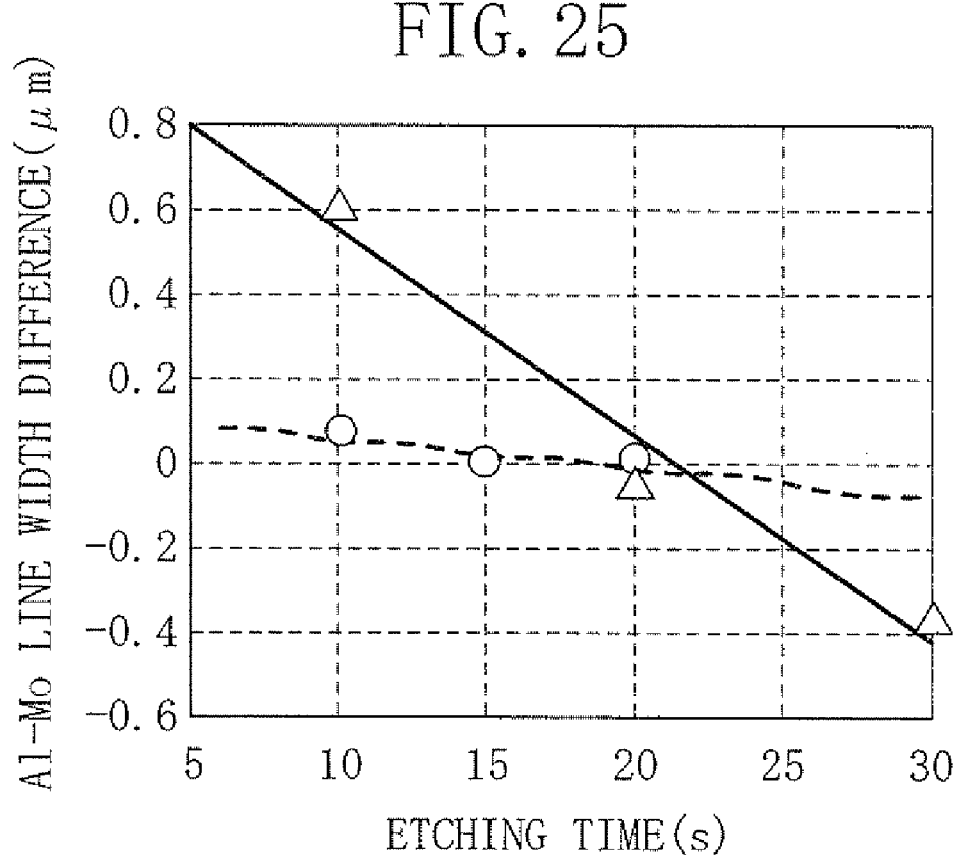
FIG. 25 is a graph showing the relation between etching time in patterning a layered film of an IZO film, aluminum film and molybdenum film between pixels and a line width difference between the patterned aluminum layer and molybdenum layer in the active matrix substrates $20a$ and $120b$.
Figure 26:
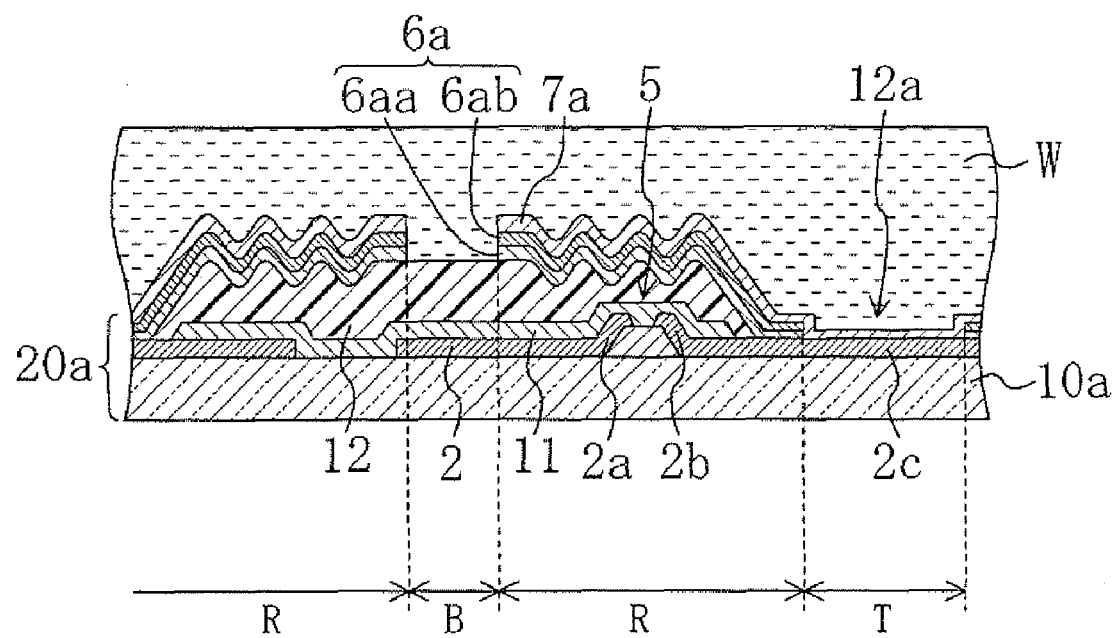
FIG. 26 is a schematic cross-sectional view showing a state of the active matrix substrate $20a$ in a second etching step of the first embodiment.
Figure 41:
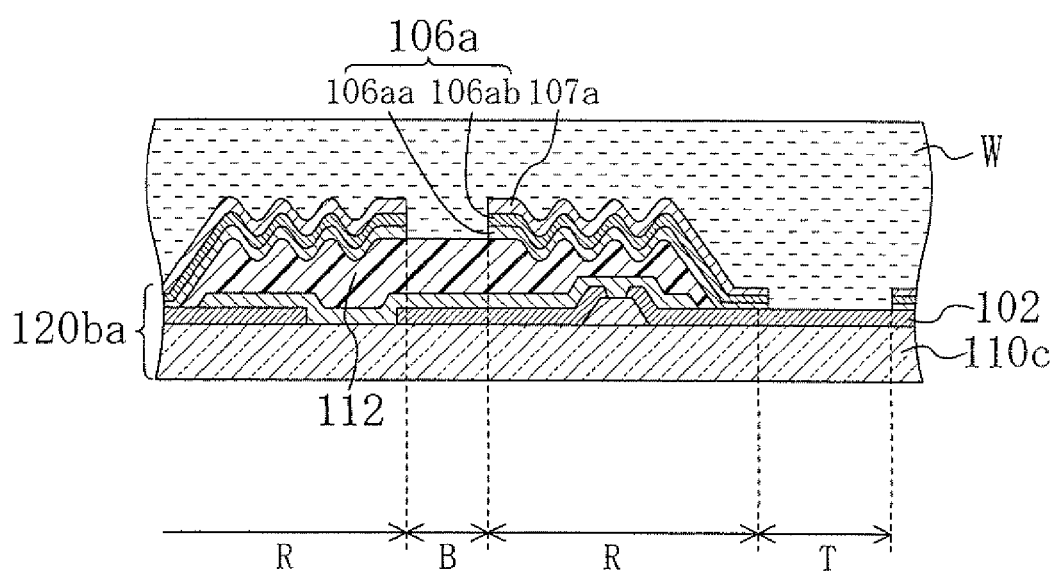
FIG. 41 is a schematic cross-sectional view showing a state of a conventional active matrix substrate 120b in an etching step corresponding to FIG. 26.

FIG. 26 is a schematic cross-sectional view showing a state of a substrate in the second etching step of the fabrication process of the active matrix substrate 20a of the first embodiment. FIG. 41 is a schematic cross-sectional view corresponding to FIG. 26 and showing a state of a substrate in an etching step of the conventional active matrix substrate 120b. FIG. 25 is a graph showing the relation between the etching time in patterning the layered film of IZO film, aluminum film and molybdenum film between pixels and the line width difference between the patterned aluminum layer and molybdenum layer in the active matrix substrate 20a and the active matrix substrate 120b. Note that, in FIG. 25, each triangle shows the result in the active matrix substrate 20a and each circle shows the result in the active matrix substrate 120b.

Figure 27:
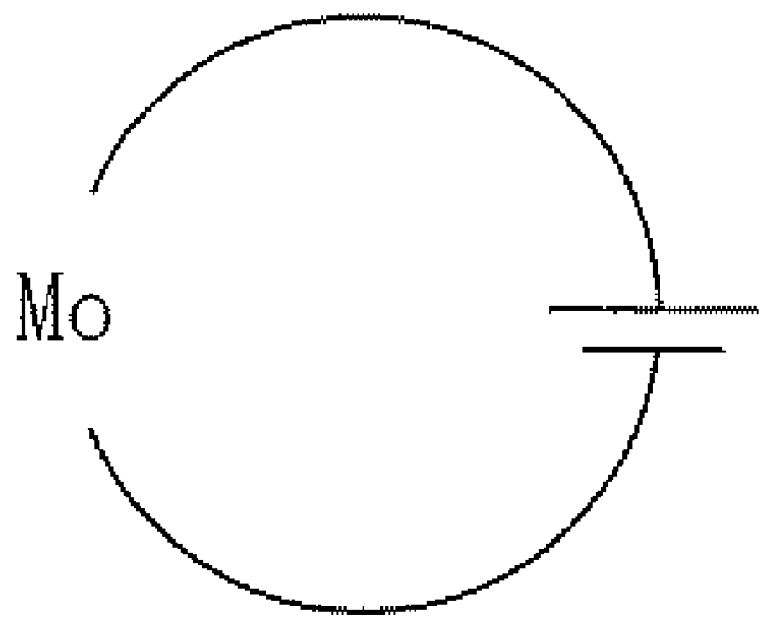
FIG. 27 is a schematic battery diagram showing a local battery reaction of the active matrix substrate $20a$.
Figure 42:
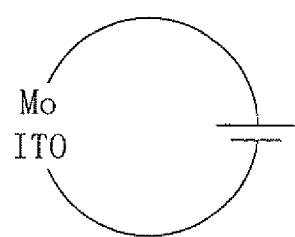
FIG. 42 is a schematic battery diagram showing a local battery reaction of the active matrix substrate 120b.

In the active matrix substrate 20a, as shown in FIG. 26, the first transparent electrode 2c made of an ITO film is covered by the second transparent electrode 7a made of an IZO film in the transmissive region T. Therefore, the ITO film is not exposed to an etchant W (for example, a mixed solution of nitric acid, phosphoric acid, and acetic acid as described in the first embodiment), and is etched at a relatively high rate by a local battery reaction shown in a schematic battery diagram of FIG. 27. In the active matrix substrate 120b, as shown in FIG. 41, the first transparent electrode 102 made of an ITO film is exposed to an etchant W in the transmissive region T, and is etched at a relatively low rate by a local battery reaction shown in a schematic battery diagram of FIG. 42.

It can therefore be considered as follows: the etching rate of the molybdenum layer 6aa is high in the active matrix substrate 20a. Therefore, the line width difference between the aluminum layer 6ab and the molybdenum layer 6aa varies if the immersion time in the etchant W varies (see the triangles in FIG. 25). The etching rate of the molybdenum layer 106aa is low in the active matrix substrate 120b. Therefore, the line width difference between the aluminum layer 106ab and the molybdenum layer 106aa is stable even if the immersion time in the etchant W varies (see the circles in FIG. 25).

As a result of keen study, the inventors uniquely found that the etching rate of the molybdenum layer 6aa depends on the underlying first transparent electrode 2c made of an ITO film. The inventors therefore fabricated an active matrix substrate 20ca shown in a plan view of FIG. 28 and a cross-sectional view of FIG. 29 and an active matrix substrate 20da shown in a plan view of FIG. 30 and a cross-sectional view of FIG. 31 and verified the relation between the etching time and the line width difference between the aluminum layer and the molybdenum layer.

Figure 28:
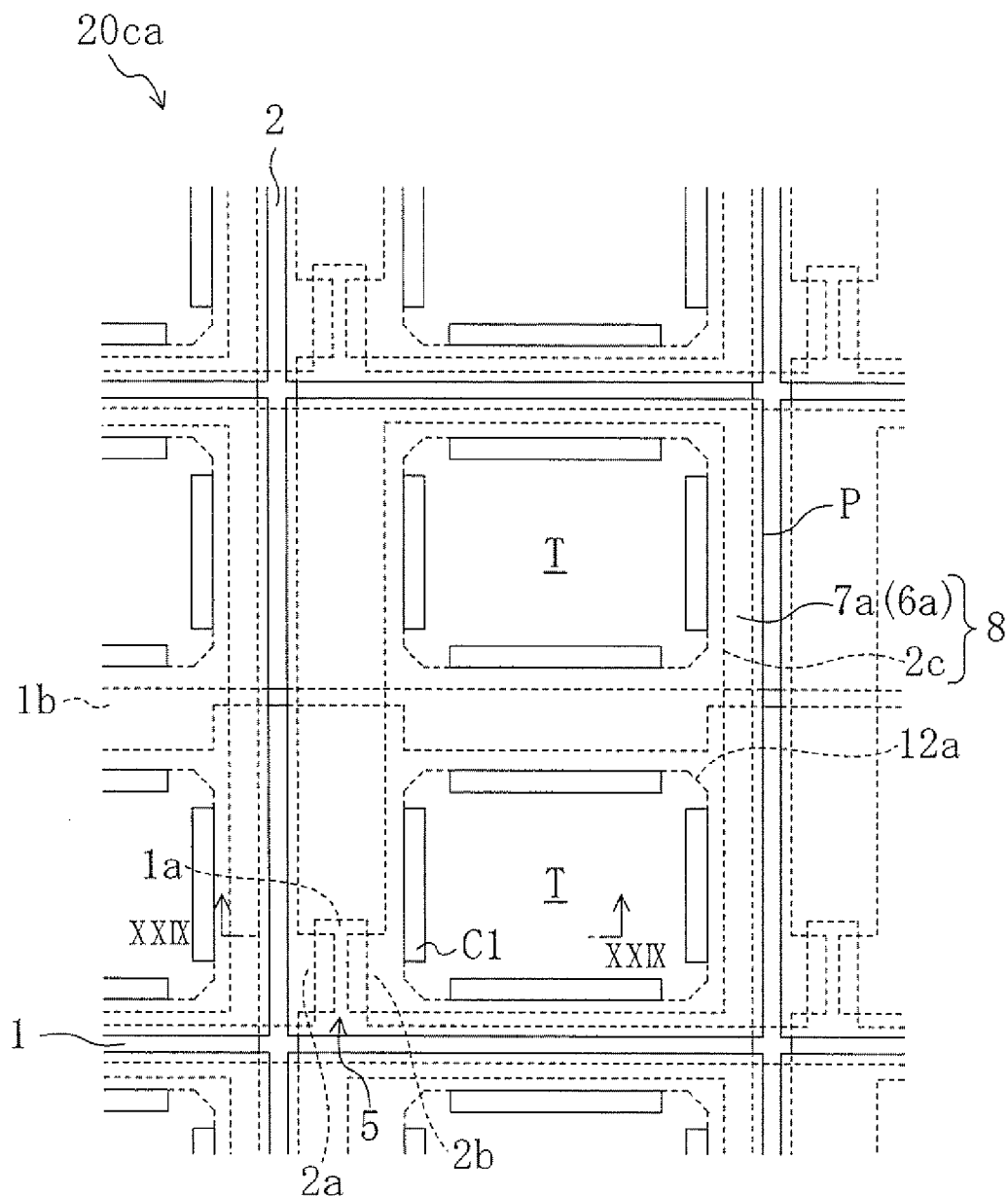
FIG. 28 is a plan view of an active matrix substrate $20ca$ of a semi-transmissive liquid crystal display device according to a third embodiment.
Figure 29:
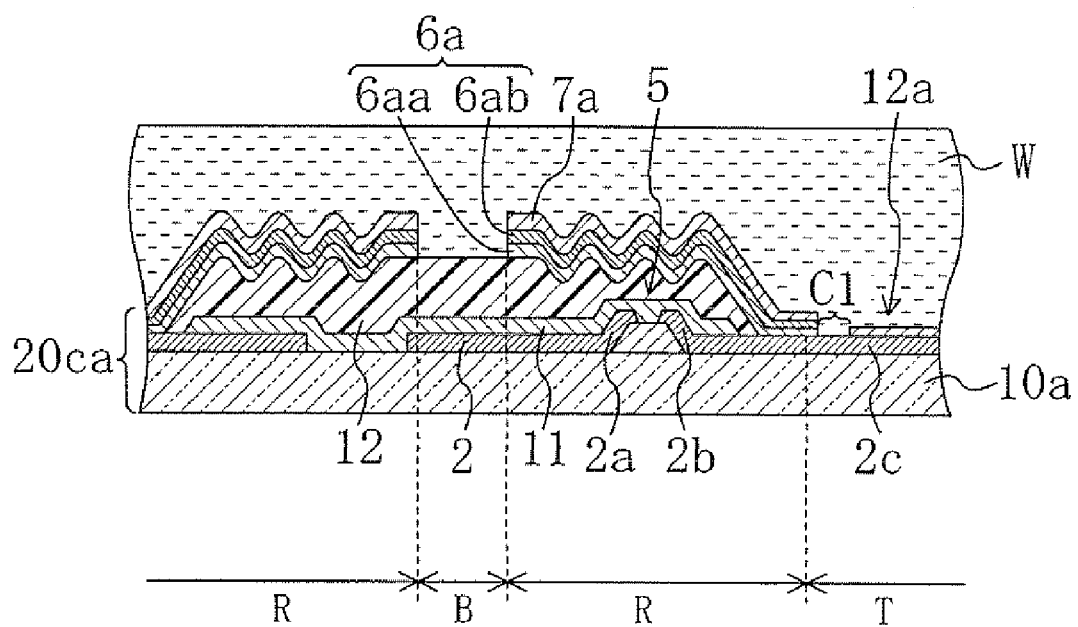
FIG. 29 is a cross-sectional view of the active matrix substrate 20ca taken along line XXIX-XXIX in FIG. 28.

In the active matrix substrate 20ca, as shown in FIG. 28, capacitor lines 1b are provided so as to extend in parallel with each other between gate lines 1, and a transmissive region T is formed on both sides of the capacitor line 1b in each pixel P. A reflective region R is formed around each transmissive region T. As shown in FIG. 28, each transmissive region T has an approximately rectangular shape. An opening C1 is formed in a second transparent electrode 7a along each side of each transmissive region T and exposes a part of a first transparent electrode 2c, as shown in FIG. 29. Each capacitor line 1b has a laterally protruding portion in every pixel P and forms an auxiliary capacitor with the first transparent electrode 2c and a gate insulating film provided between the capacitor line 1b and the first transparent electrode 2c. In each pixel P, the distance between gate lines 1 is, for example, 327 µm and the distance between source lines 2 is, for example, 109 µm. Each transmissive region T has an approximately rectangular shape of, for example, 70 µm long by 80 µm wide having its four corners chamfered with a chamfered size of, for example, 5 µm long by 5 µm wide. The opening C1 is, for example, 5 µm in the width direction and 30 µm to 45 µm in the length direction.

Figure 30:
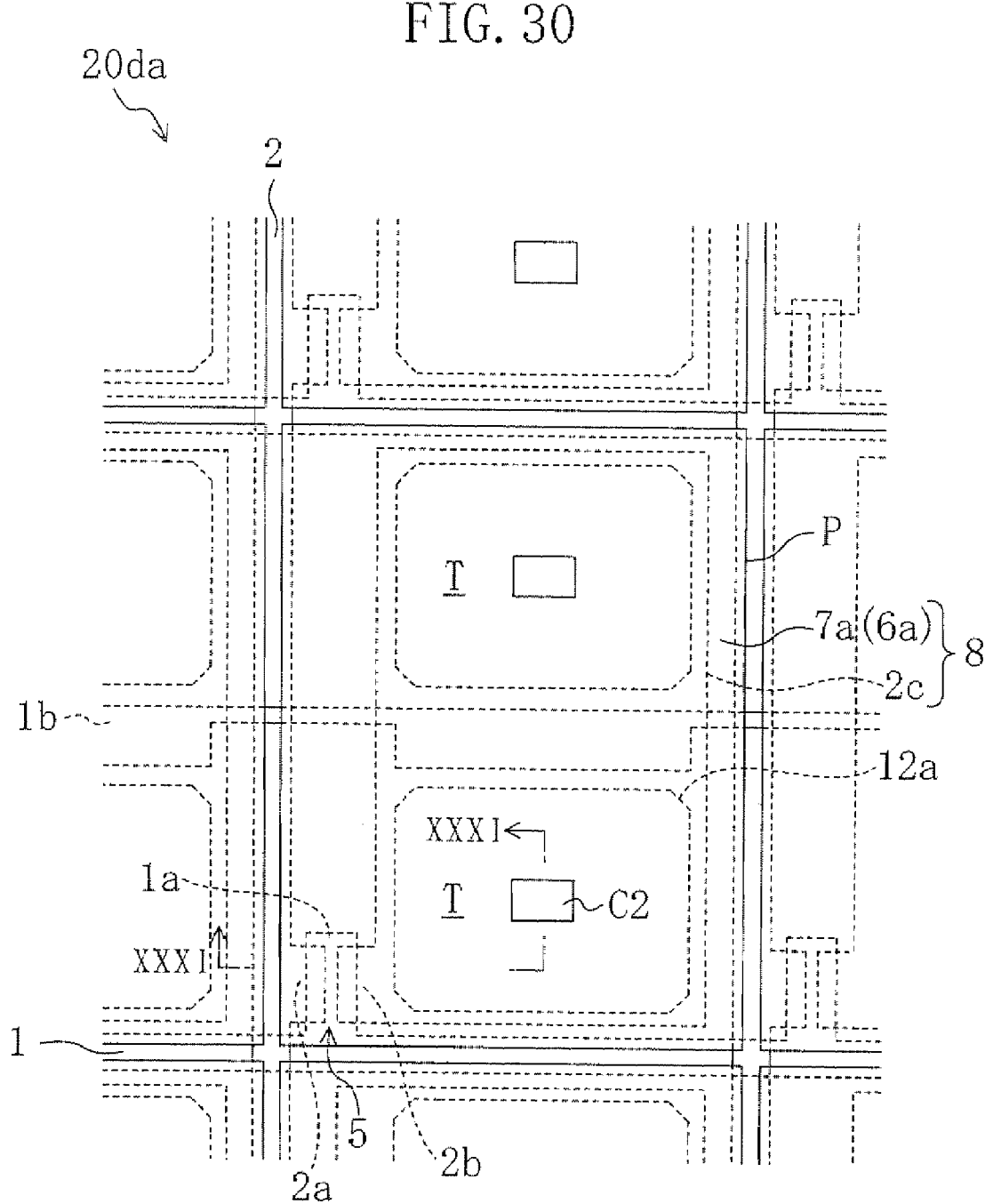
FIG. 30 is a plan view of an active matrix substrate 20da of the semi-transmissive liquid crystal display device according to the third embodiment.
Figure 31:
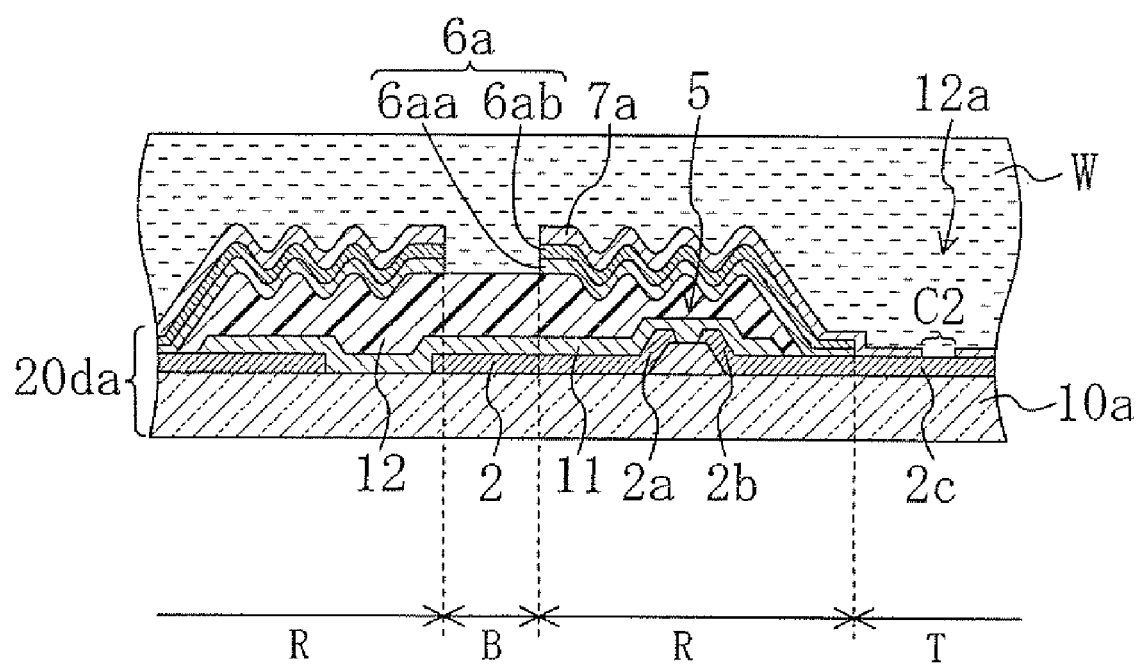
FIG. 31 is a cross-sectional view of the active matrix substrate 20da taken along line XXXI-XXXI in FIG. 30.

In the active matrix substrate 20*da*, as shown in FIGS. 30 and 31, an opening C2 is formed in a second transparent electrode 7*a* in each transmissive region T and exposes a part of the center of a first transparent electrode 2*c*. Note that the opening C2 has a rectangular shape of, for example, 10 µm long by 15 µm wide.

Figure 32:
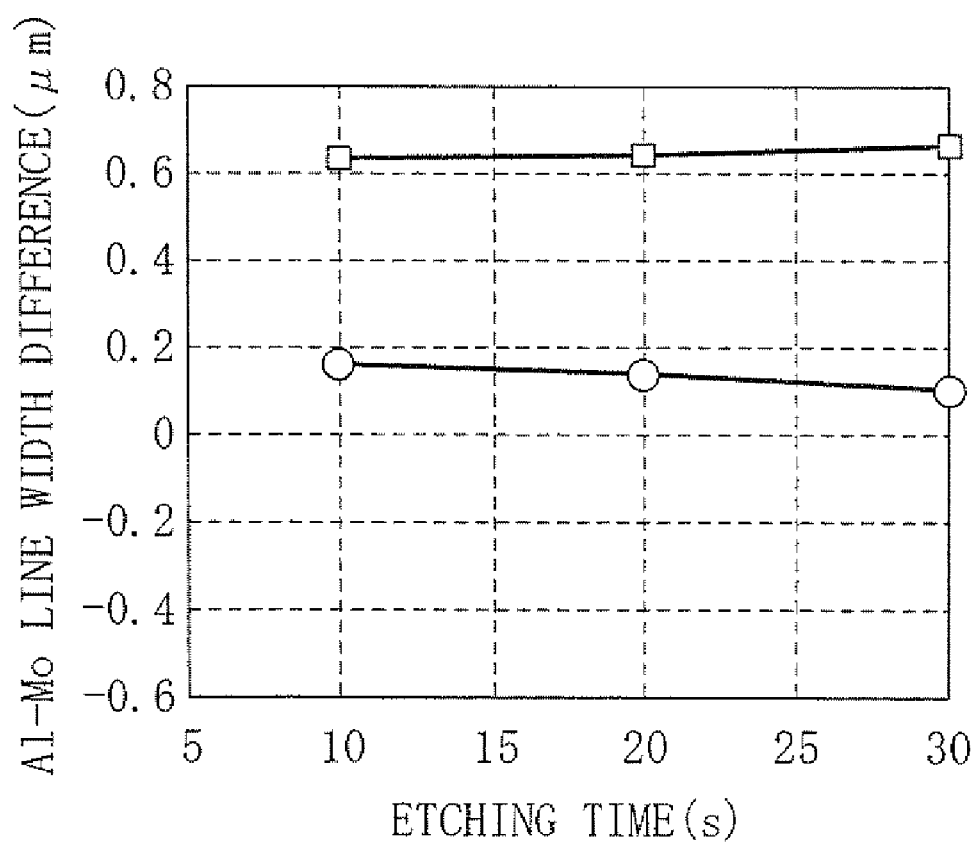
FIG. 32 is a graph showing the relation between etching time of a second etching step and a line width difference between the patterned aluminum layer and molybdenum layer in the active matrix substrates 20ca and 20da.

FIG. 32 is a graph showing the relation between the etching time in the second etching step and the line width difference between the patterned aluminum layer and molybdenum layer in the active matrix substrate 20*ca* and the active matrix substrate 20*da*. Note that, in FIG. 32, each circle shows the result in the active matrix substrate 20*ca* and each square shows the result in the active matrix substrate 20*da*.

Figure 33:
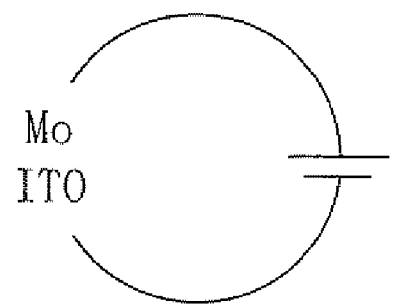
FIG. 33 is a schematic battery diagram showing a local battery reaction of the active matrix substrate 20ca.

In the active matrix substrate 20*ca*, as shown in FIG. 29, a part of the first transparent electrode 2*c* made of an ITO film is exposed by the opening C1 in the transmissive region T. Therefore, the ITO film (first transparent electrode 2*c*) is exposed to an etchant W with the molybdenum film (molybdenum layer 6*aa*) and the ITO film (first transparent electrode 2*c*) being in direct contact with each other. The ITO film is thus etched at a relatively low rate by a local battery reaction shown in a schematic battery diagram of FIG. 33. In the active matrix substrate 20*ca*, as shown by the circles in FIG. 32, the line width difference between the aluminum layer 6*ab* and the molybdenum layer 6*aa* is 0.1 µm to 0.2 µm even if the immersion time in the etchant W varies (10 seconds to 30 seconds). The line width difference between the aluminum layer 6*ab* and the molybdenum layer 6*aa* is thus stable.

Figure 34:
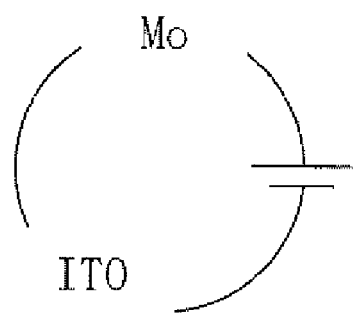
FIG. 34 is a schematic battery diagram showing a local battery reaction of the active matrix substrate 20da.

In the active matrix substrate 20*da*, as shown in FIG. 31, a part of the first transparent electrode 2*c* made of an ITO film is exposed by the opening C2 in the transmissive region T. Therefore, the ITO film (first transparent electrode 2*c*) is exposed to an etchant W with the molybdenum film (molybdenum layer 6*aa*) and the ITO film (first transparent electrode 2*c*) being in contact with each other through the etchant W. The ITO film is thus etched at a relatively low rate by a local battery reaction shown in a schematic battery diagram of FIG. 34. In the active matrix substrate 20*da*, as shown by the squares in FIG. 32, the line width difference between the aluminum layer 6*ab* and the molybdenum layer 6*aa* is 0.6 µm to 0.7 µm even if the immersion time in the etchant W varies (10 seconds to 30 seconds). The line width difference between the aluminum layer 6*ab* and the molybdenum layer 6*aa* is thus stable. Note that, with this line width difference (0.6 µm to 0.7 µm) between the aluminum layer 6*ab* and the molybdenum layer 6*aa*, the difference between the respective outer peripheral ends E of the second transparent electrode 7*a* and the reflective electrode 6*a* does not fall within the range (within ±0.2 µm) shown in the first embodiment. However, since the line width difference between the aluminum layer 6*ab* and the molybdenum layer 6*aa* is constant (0.6 µm to 0.7 µm) in the substrate surface, the difference between the outer peripheral end E of the reflective electrode 6*a* formed by the molybdenum layer 6*aa* and the aluminum layer 6*ab* and the outer peripheral end E of the second transparent electrode 7*a* also becomes constant. This active matrix substrate can thus suppress variation in overlap width between each source line 2 provided between the pixels P and the respective outer peripheral ends E of the reflective electrode 6*a* and the second transparent electrode 7*a* through the insulating layer formed by the protective insulating film 11 and the interlayer insulating film 12.

As shown by the above result of the active matrix substrates 20*ca* and 20*da*, it was verified that variation in line width difference between the respective outer peripheral ends E of the aluminum layer 6*ab* and molybdenum layer 6*aa* of the reflective electrode 6*a* can be suppressed by wet-etching the IZO film so as to expose a part of the first transparent electrode 2*c* made of an ITO film in the transmissive region T.

Figure 35:
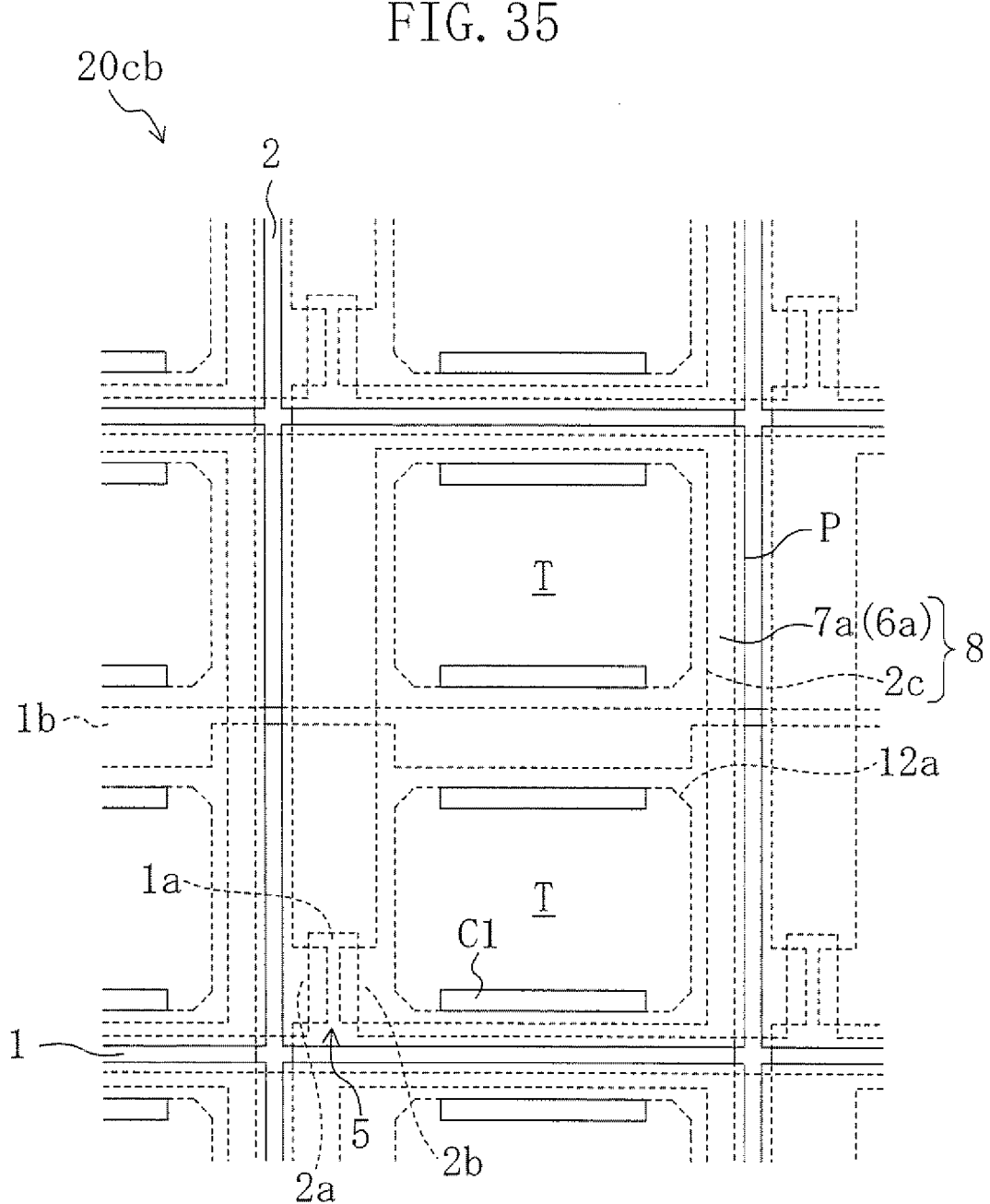
FIG. 35 is a plan view of another active matrix substrate 20cb similar to the active matrix substrate 20ca.
Figure 36:
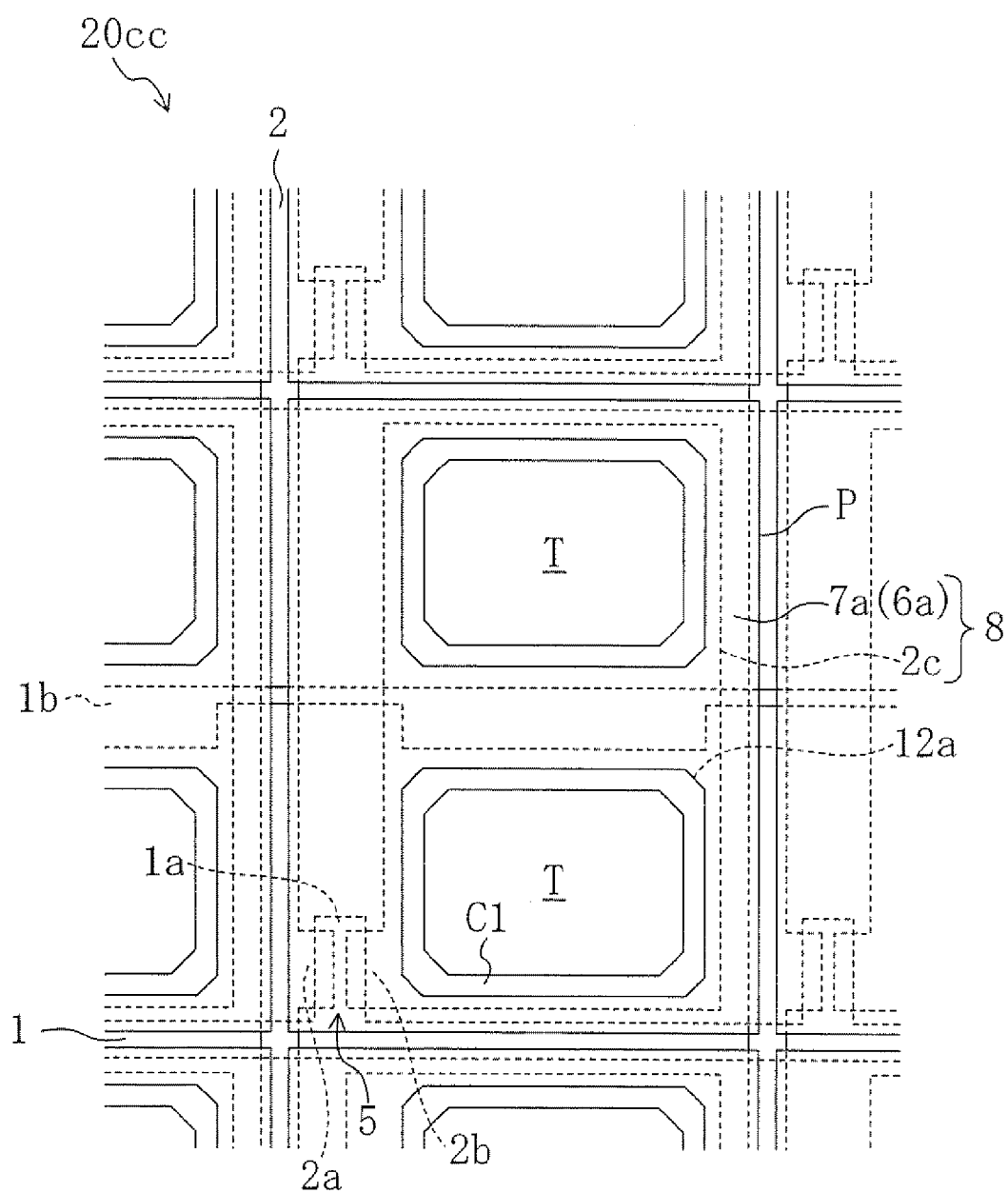
FIG. 36 is a plan view of another active matrix substrate 20cc similar to the active matrix substrate 20ca.
Figure 37:
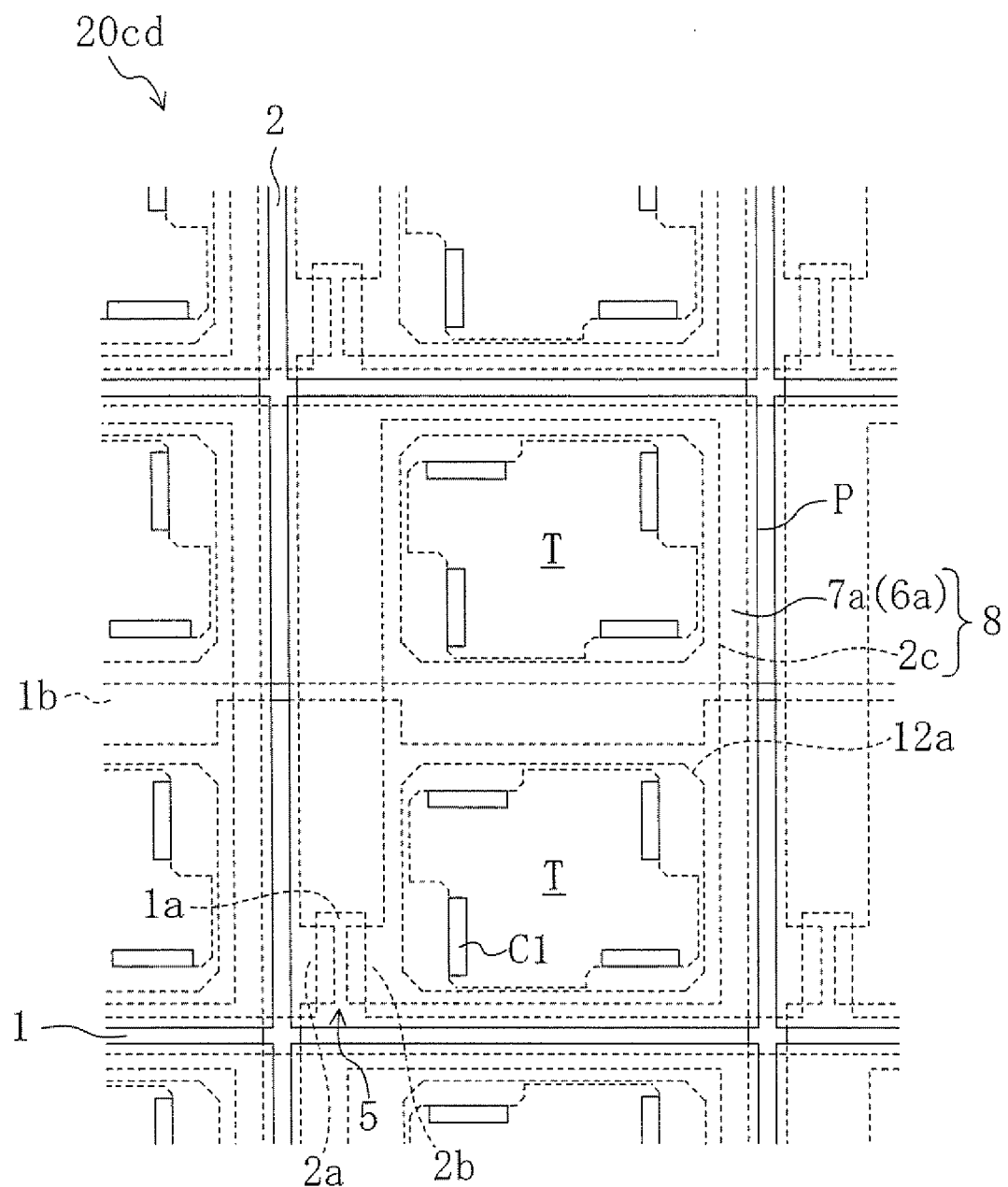
FIG. 37 is a plan view of another active matrix substrate 20cd similar to the active matrix substrate 20ca.

FIGS. 35 through 37 show other examples of the active matrix substrate similar to the active matrix substrate 20*ca* of FIG. 28 and capable of suppressing variation in line width difference between the aluminum layer 6*ab* and the molybdenum layer 6*aa*.

In an active matrix substrate 20*cb*, as shown in FIG. 35, a pair of openings C1 exposing a part of the first transparent electrode 2*c* are formed in the second transparent electrode 7*a* in the upper- and lower-side portions of each transmissive region T.

In an active matrix substrate 20*cc*, as shown in FIG. 36, an annular opening C1 exposing a part of the first transparent electrode 2*c* is formed in the second transparent electrode 7*a* in the peripheral portion of each transmissive region T.

In an active matrix substrate 20*cd*, as shown in FIG. 37, the reflective electrode 6*a* forming the reflective region R is extended with a rectangular shape at the four corners of each transmissive region T as light shielding portions, and an opening C1 is formed inside each light shielding portion. The light shielding portions are located at the four corners of each rectangular opening 12*a* in the interlayer insulating film 12, and the orientation state of the liquid crystal molecules becomes discontinuous in these regions. Accordingly, in the active matrix substrate 20*cd*, the regions having a locally reduced response speed of the liquid crystal molecules are shielded by the light shielding portions formed by the extended portion of the reflective electrode 6*a*, so that these regions cannot contribute to display.

Figure 38:
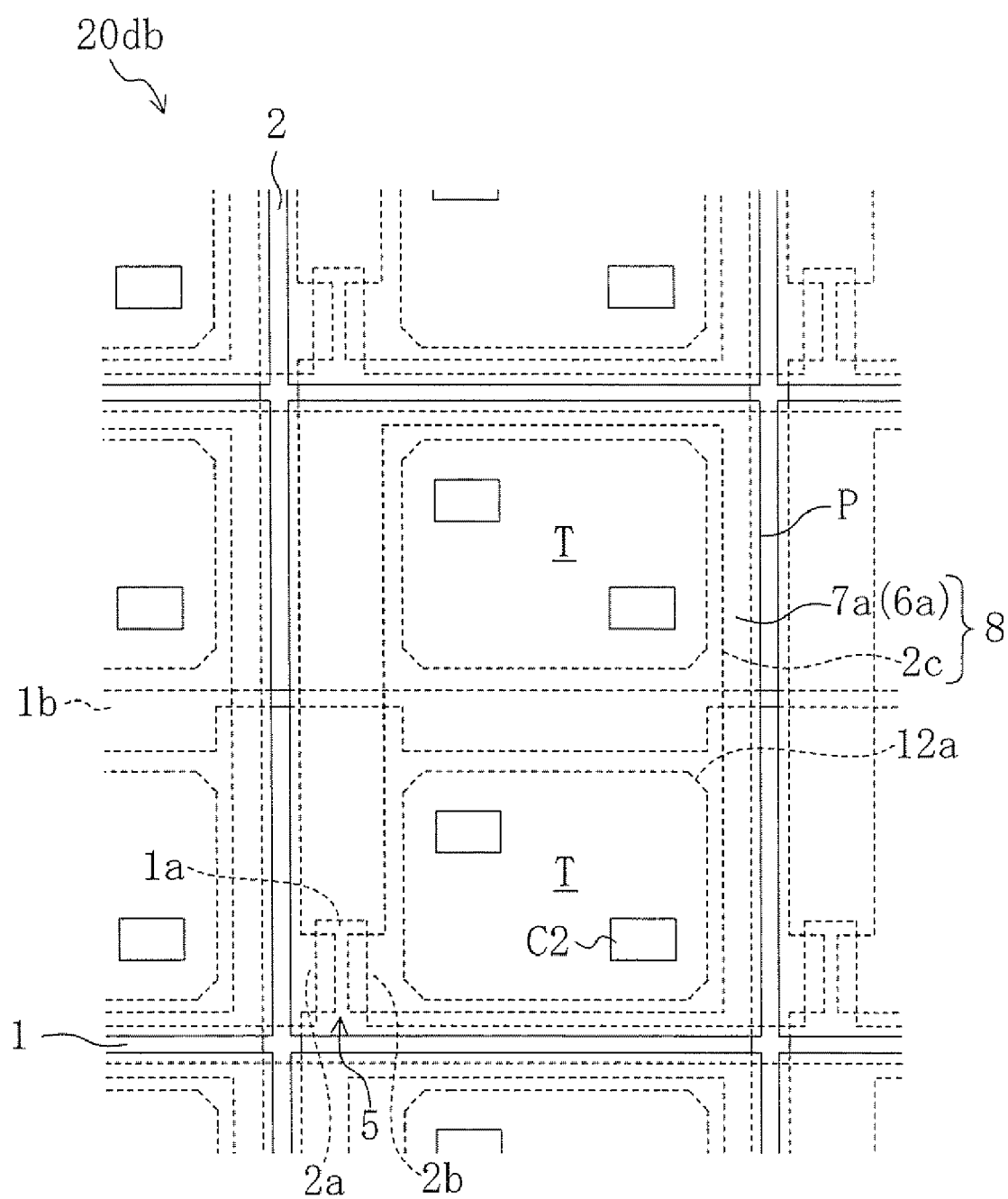
FIG. 38 is a plan view of another active matrix substrate 20db similar to the active matrix substrate 20da.
Figure 39:
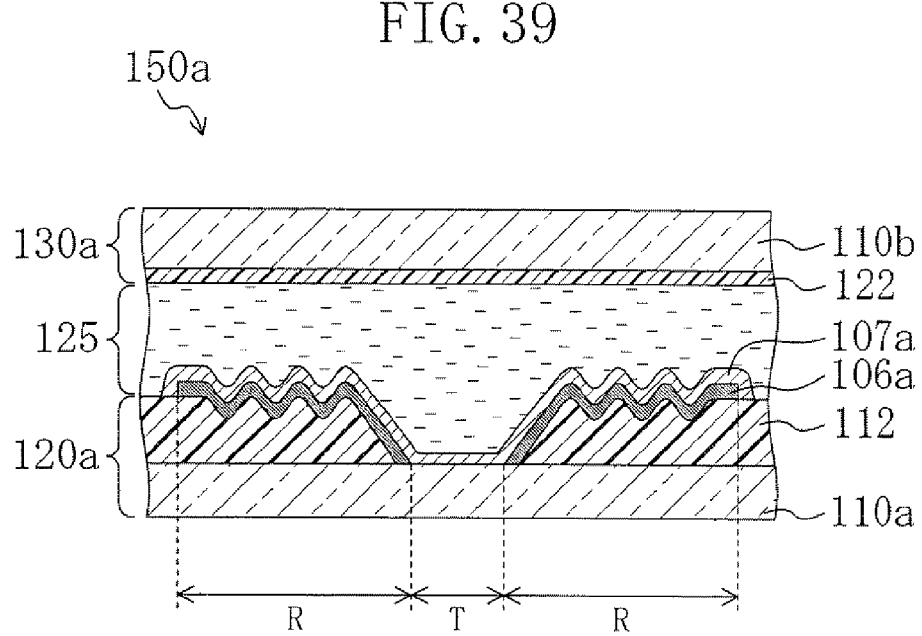

FIG. 38 shows another example of the active matrix substrate similar to the active matrix substrate 20*da* of FIG. 30 and capable of suppressing variation in line width difference between the aluminum layer 6*ab* and the molybdenum layer 6*aa*.

In the active matrix substrate 20*db*, as shown in FIG. 38, two openings C2 exposing a part of the first transparent electrode 2*c* are formed in the second transparent electrode 7*a* of each transmissive region T.

As has been described above, according to the manufacturing method of the semi-transmissive liquid crystal display device of this embodiment, the IZO film is wet-etched so as to expose a part of the first transparent electrode 2*c* of each pixel P in the second etching step. The first transparent electrode 2*c* is therefore exposed to the etchant. Accordingly, when the layered film of the reflective conductive layer 6*b* made of the molybdenum film and the aluminum film and the IZO film is etched in a region between the pixels P in the second etching step, the etching rate of the molybdenum film (molybdenum layer 6*aa*) is lower than that in the case where a part of the first transparent electrode 2*c* is not exposed in each pixel P. Therefore, the etching amount of the molybdenum film (molybdenum layer 6*aa*) is less likely to vary even if the etching time in the second etching step varies. This improves dimensional accuracy of the molybdenum layer 6*aa* formed by the molybdenum film. As a result, the respective outer peripheral ends of the molybdenum layer 6*aa* and the aluminum layer 6*ab* are more likely to be aligned with each other, and the respective outer peripheral ends of the reflective electrode 6*a* formed by the molybdenum layer 6aa and aluminum layer 6ab and the second transparent electrode 7a are more likely to be aligned with each other. This structure can suppress variation in overlap width between each source line 2 provided between the pixels P and the respective outer peripheral ends E of the reflective electrode 6a and the second transparent electrode 7a through the insulating layer formed by the protective insulating film 11 and the interlayer insulating film 12, and can thus suppress variation in parasitic capacitance between each source line 2 and the reflective electrode 6a and second transparent electrode 7a. Accordingly, the invention can provide a semi-transmissive liquid crystal display device in which normal conduction between a reflective electrode and a transparent electrode and a high reflectance are maintained, whereby generation of flicker is suppressed and variation in parasitic capacitance between a source line and a reflective electrode and transparent electrode is suppressed.

Note that this embodiment can also be applied to the second embodiment.

INDUSTRIAL APPLICABILITY

As has been described above, the invention enables flicker to be less likely to be visually recognized in a semi-transmissive liquid crystal display device. Therefore, the invention is useful for a semi-transmissive liquid crystal display device for which high display quality is required.

The invention claimed is:

1. A semi-transmissive liquid crystal display device, comprising:
   an active matrix substrate and a counter substrate which are provided so as to face each other; and
   a liquid crystal layer provided between the active matrix substrate and the counter substrate, wherein a plurality of pixels each having a reflective region for providing reflection mode display and a transmissive region for providing transmission mode display are arranged in a matrix pattern,
   the active matrix substrate includes a plurality of source lines extending in parallel with each other between the pixels, a first transparent electrode provided in each pixel and connected to each source line through a switching element, an insulating layer provided on the first transparent electrode and having an opening in each pixel, a reflective electrode provided in each pixel on the insulating layer and connected to the first transparent electrode through the opening, and a second transparent electrode provided in each pixel, overlapping the reflective electrode and an exposed region of the first transparent electrode from the reflective electrode, and connected to the reflective electrode and the first transparent electrode,
   a region where the reflective electrode is formed and the exposed region of the first transparent electrode from the reflective electrode form the reflective region and the transmissive region, respectively, and
   respective outer peripheral ends of the reflective electrode and the second transparent electrode are aligned with each other in each pixel.

2. The semi-transmissive liquid crystal display device according to claim 1, wherein the first transparent electrode is made of a compound of indium oxide and tin oxide, and the second transparent electrode is made of a compound of indium oxide and zinc oxide.

3. The semi-transmissive liquid crystal display device according to claim 2, wherein the second transparent electrode has a thickness of 50 Å to 300 Å.

4. The semi-transmissive liquid crystal display device according to claim 1, wherein the liquid crystal layer is structured so as to be vertically oriented when no voltage is applied.

5. The semi-transmissive liquid crystal display device according to claim 1, wherein the insulating layer is formed so that a thickness of the liquid crystal layer in the reflective region becomes one half of a thickness of the liquid crystal layer in the transmissive region.

6. The semi-transmissive liquid crystal display device according to claim 1, wherein the reflective electrode has a first metal layer provided in contact with the first transparent electrode and a second metal layer formed on the first metal layer, and the second transparent electrode has an opening formed so as to expose a part of the first transparent electrode.

7. The device of claim 1, wherein said second transparent electrode overlaps and directly contacts a substantial portion of the area of the first transparent electrode in the opening in the insulating layer which is not covered by the reflective electrode.

8. A method for manufacturing a semi-transmissive liquid crystal display device including an active matrix substrate and a counter substrate which are provided so as to face each other, and a liquid crystal layer provided between the active matrix substrate and the counter substrate, wherein a plurality of pixels each having a reflective region for providing reflection mode display and a transmissive region for providing transmission mode display are arranged in a matrix pattern, comprising the steps of:
   a first transparent electrode formation step of forming a plurality of source lines extending in parallel with each other on a substrate and forming in each pixel a first transparent electrode connected to each source line through a switching element;
   an insulating layer formation step of forming on the first transparent electrode an insulating layer having an opening in each pixel;
   a reflective conductive film formation step of forming a reflective conductive film so as to cover the insulating layer;
   a first etching step of, by etching a portion of the reflective conductive film corresponding to the opening, forming a reflective conductive layer connected to the first transparent electrode through the opening of the insulating layer;
   a transparent conductive film formation step of forming a transparent conductive film so as to cover the reflective conductive layer; and
   a second etching step of, by etching a portion of the reflective conductive layer and transparent conductive film located between the pixels, forming a reflective electrode connected to the first transparent electrode through the opening of the insulating layer, and a second transparent electrode overlapping the reflective electrode and an exposed region of the first transparent electrode from the reflective electrode and connected to the reflective electrode and the first transparent electrode, thereby fabricating the active matrix substrate in which a region where the reflective electrode is formed and the exposed region of the first transparent electrode from the reflective electrode serve as the reflective region and the transmissive region, respectively, wherein
   in the second etching step, the reflective conductive layer and the transparent conductive film are etched so that respective outer peripheral ends of the reflective electrode and the second transparent electrode are aligned with each other in each pixel.

9. The method for manufacturing a semi-transmissive liquid crystal display device according to claim 8, wherein the first transparent electrode is made of a compound of indium oxide and tin oxide, and the second transparent electrode is made of a compound of indium oxide and zinc oxide.

10. The method for manufacturing a semi-transmissive liquid crystal display device according to claim 8, wherein in the reflective conductive film formation step, a first metal film and a second metal film are sequentially formed so as to cover the insulating layer, and in the second etching step, the transparent conductive film is wet-etched so as to expose a part of the first transparent electrode in each pixel.

* * * * *